United States Patent
Doron

(10) Patent No.: US 6,650,368 B1
(45) Date of Patent: Nov. 18, 2003

(54) DIGITAL CAMERA AND METHOD OF ENHANCING ZOOM EFFECTS

(75) Inventor: Amir Doron, San Diego, CA (US)

(73) Assignee: Hewlett-Packard Development Company, IP., Houston, TX (US)

( * ) Notice: Subject to any disclaimer, the term of this patent is extended or adjusted under 35 U.S.C. 154(b) by 0 days.

(21) Appl. No.: 09/426,469

(22) Filed: Oct. 26, 1999

(51) Int. Cl.[7] .............................................. H04N 5/262
(52) U.S. Cl. .................................................. 348/240.2
(58) Field of Search ........................ 348/240.2, 240.1, 348/240.99, 561; 382/299

(56) References Cited

U.S. PATENT DOCUMENTS

| | | | |
|---|---|---|---|
| 5,027,214 A | 6/1991 | Fujimori | 358/209 |
| 5,249,053 A | 9/1993 | Jain | 358/209 |
| 5,418,565 A | 5/1995 | Smith | 348/273 |
| 5,467,129 A | 11/1995 | Suzuki | 348/231 |
| 5,493,335 A | 2/1996 | Parulski et al. | 348/233 |
| 5,543,925 A | 8/1996 | Timmermans | 358/310 |
| 5,684,532 A * | 11/1997 | Ely | 348/240.99 |
| 5,926,218 A * | 7/1999 | Smith | 348/207.99 |
| 5,946,109 A | 8/1999 | Abe | 358/474 |

FOREIGN PATENT DOCUMENTS

| | | | |
|---|---|---|---|
| JP | 110127344 | 5/1999 | H04N/1/393 |

* cited by examiner

*Primary Examiner*—Aung S. Moe
(74) *Attorney, Agent, or Firm*—Jerry R. Potts

(57) ABSTRACT

A digital camera includes a processor having an algorithm for comparing a set of resolution pixel values in a generated image file with corresponding ones of resolution pixel values in a user selected file and for providing as a final digital zoom image resolution the set of resolution pixel values in the generated image file when the corresponding ones of the resolution pixel values in the user selected file are at least equal but not less than the corresponding resolution pixel values in the generated image file, and a scaled down set of resolution pixel values when the corresponding ones of the resolution pixel values in the user selected file are less than the corresponding resolution pixel values in the generated image file.

18 Claims, 16 Drawing Sheets

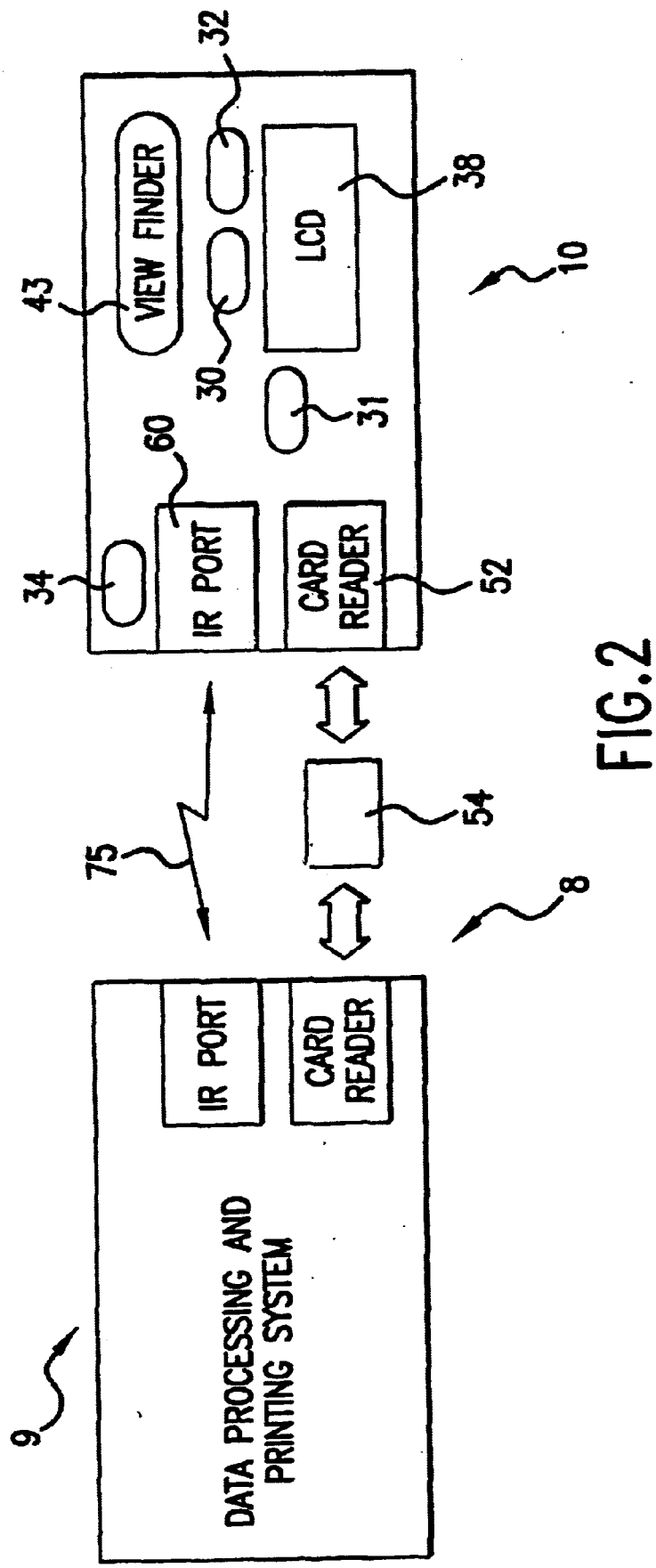

DIGITAL CAMERA AND METHOD OF ENHANCING ZOOM EFFECTS

RELATED APPLICATIONS

This application is related to U.S. patent application Ser. No.: 09/053819 entitled "Digital Camera and Method of Using Same," filed on Mar. 31, 1998; U.S. patent application Ser. No.: 09/239,899 entitled "Digital Camera with Optical Viewfinder and Method of Using Same to Visualize Optical and Digital Zoom Effects," filed on Jan. 29, 1999; and U.S. patent application Ser. No.: 09/272,876 entitled "Digital Camera and Method of Smoothing Optical and Digital Zoom Effects," filed on Mar. 19, 1999.

FIELD OF INVENTION

The present invention relates generally to cameras, and more particularly, to a digital camera having a digital zoom feature with a maximizing image resolution algorithm for improved image quality.

BACKGROUND OF THE INVENTION

In general, both digital and analog cameras must give feedback to a user of what area of a scene to be photographed will be captured when a picture is taken. This has traditionally been accomplished using a built-in device called an optical viewfinder—an optical window that enables the user to visualize the scene and see exactly what area of the scene that will be captured by the camera lens system.

In order to change the area to be captured by the camera lens system, many digital and analog cameras also include what is commonly called a zoom feature. The zoom feature is limited to optical zooming in the analog camera but may include both optical zooming and digital zooming in a digital camera.

Before discussing the merits of optical and digital zooming, it may be beneficial to briefly review the difference between what is known in the state of the art as a through the lens (TTL) camera and a point and shoot (PAS) camera.

In the TTL camera, as a user views a scene to be photographed he or she utilizes the camera viewfinder. More particularly, the user is viewing the scene through the lens system of the camera. That is, with the help of an internally positioned mirror within the TTL camera, the light passing through the lens system is reflected by the internal mirror and directed to the optical viewfinder for consideration by the user. When the user is satisfied with the scene to be captured, the mirror is repositioned allowing a direct light path to the photosensitive plane of the camera, and thus, allowing the scene to be captured as viewed through the optical viewfinder.

The PAS camera is much less expensive and does not allow the user to view the scene through the primary lens system. Instead, the optical viewfinder is provided with a secondary lens system that moves in and out in tandem with the primary lens system. In short then, in the PSA camera two separate light paths are established; one light path for the primary lens system to the photosensitive plane of the camera and another light path through the secondary lens system to the viewfinder for the scene preview benefit of the user.

Considering now the merits of the two types of zooming, optical zooming and digital zooming, it will be understood by those skilled in the art that optical zooming is a mechanical operation that affects movement of the primary lens system so as to enlarge or reduce a viewed object. Thus, for example, by moving the primary lens system a user may, in a smooth mechanical transition, view a group arrangement of flowers down to a single flower within the group and then back to the entire arrangement. This transition is commonly called "zooming in" and "zooming out" of the scene.

With the advent of digital cameras and photography, two new developments emerged: imaging view display modules, known as liquid crystal display (LCD) units and digital zooming. With the LCD unit, a user is able to independently view the scene both before the image is captured, in a preview mode of operation, and after the image has been captured and stored, in a post-view or review mode of operation. In short then, the preview mode of operation is essentially the same mode of operation found in a TTL type of camera as the image displayed on the LCD is taken directly from the photosensitive plane of the digital camera that is otherwise called a charged couple device (CCD).

Digital zooming is an electrical manipulation that selects a portion of the image converted by the CCD so that the selected portion appears to be enlarged when viewed on the whole viewing area of the LCD. From the foregoing, it will be understood by those skilled in the art that the same effects of optical zooming can be achieved and viewed on the LCD without having to incur the high costs associated with providing a moving primary lens system. The trade off for such a benefit however, is degradation in the image quality as viewed on the LCD as the CCD utilizes fewer pixel locations.

In certain high-end digital cameras, the degradation in image quality brought about by digital zooming is overcome by providing a conventional optical zooming feature. In this type of camera, the viewfinder tracks the camera lens to enable the user to visually see the effects of the optical zooming. Alternatively, the user may also view the effects of the optical zooming on the LCD in the preview mode of operation as the magnification is achieved by the primary lens system prior to the object image being converted by the CCD. In most situations however, the user will not utilize the LCD for the purpose of observing optical zooming as LCD use places a high electrical drain on the battery system of the camera.

Recently, certain digital cameras have been offered providing both optical and digital zooming. In such cameras, the user is able to select which one of the effects is desired to arrive at a desired magnification. Thus, for example to arrive at a 4×-magnification factor a user could select a 2× optical effect and a 2× digital effect.

While such combined effects are desirable in the preview mode of operation, the combined zooming effect has been less than desirable due to the high electrical drain on the camera battery system. That is as the user gets the "what you see is what you get" view of image data only by viewing the LCD image there is a constant power drain when the combined zoom effect is in operation.

From the foregoing, it should be understood that when the LCD is powered off, the user is limited to viewing only the optical zooming effects through the viewfinder. In this regard, in prior art digital camera with combined zoom features, the optical zoom is always enabled while the digital zoom is only enabled when the LCD is in a powered up state of operation. In this manner, the user would never be in a situation of guessing at what exactly is included in the scene to be captured.

While the above discussed cameras and methods of operation provide the combined effects of both optical and digital zooming, the effects of the digital zooming significantly reduce the useful operating period of the camera relative to the available battery power source. In other words, with a combined optical and digital zooming feature camera, the costs of operating the camera are significantly higher as expensive batteries must be replaced on a much more frequent basis.

Therefore it would be highly desirable to have a new and improved digital camera that is easy to use providing continuous coverage with maximum image quality for any magnification.

DISCLOSURE OF THE INVENTION

In accordance with the present invention, a new and improved digital camera includes a processor having an algorithm for comparing a set of resolution pixel values in a generated image file with corresponding ones of resolution pixel values in a user selected file and for providing as a final digital zoom image resolution the set of resolution pixel values in the generated image file when the corresponding ones of the resolution pixel values in the user selected file are at least equal but not less than the corresponding resolution pixel values in the generated image file, and a scaled down set of resolution pixel values when the corresponding ones of the resolution pixel values in the user selected file are less than the corresponding resolution pixel values in the generated image file.

BRIEF DESCRIPTION OF DRAWINGS

The above mentioned features of the present invention and the manner of attaining them will become apparent and the invention itself will be best understood by reference to the following description of the preferred embodiment of the invention, in conjunction with the accompanying drawings, wherein:

FIG. 2 is a block diagram of the digital camera of FIG. 1 illustrating its use with a data processing system;

BEST MODE FOR CARRYING OUT THE INVENTION

Figure 1:
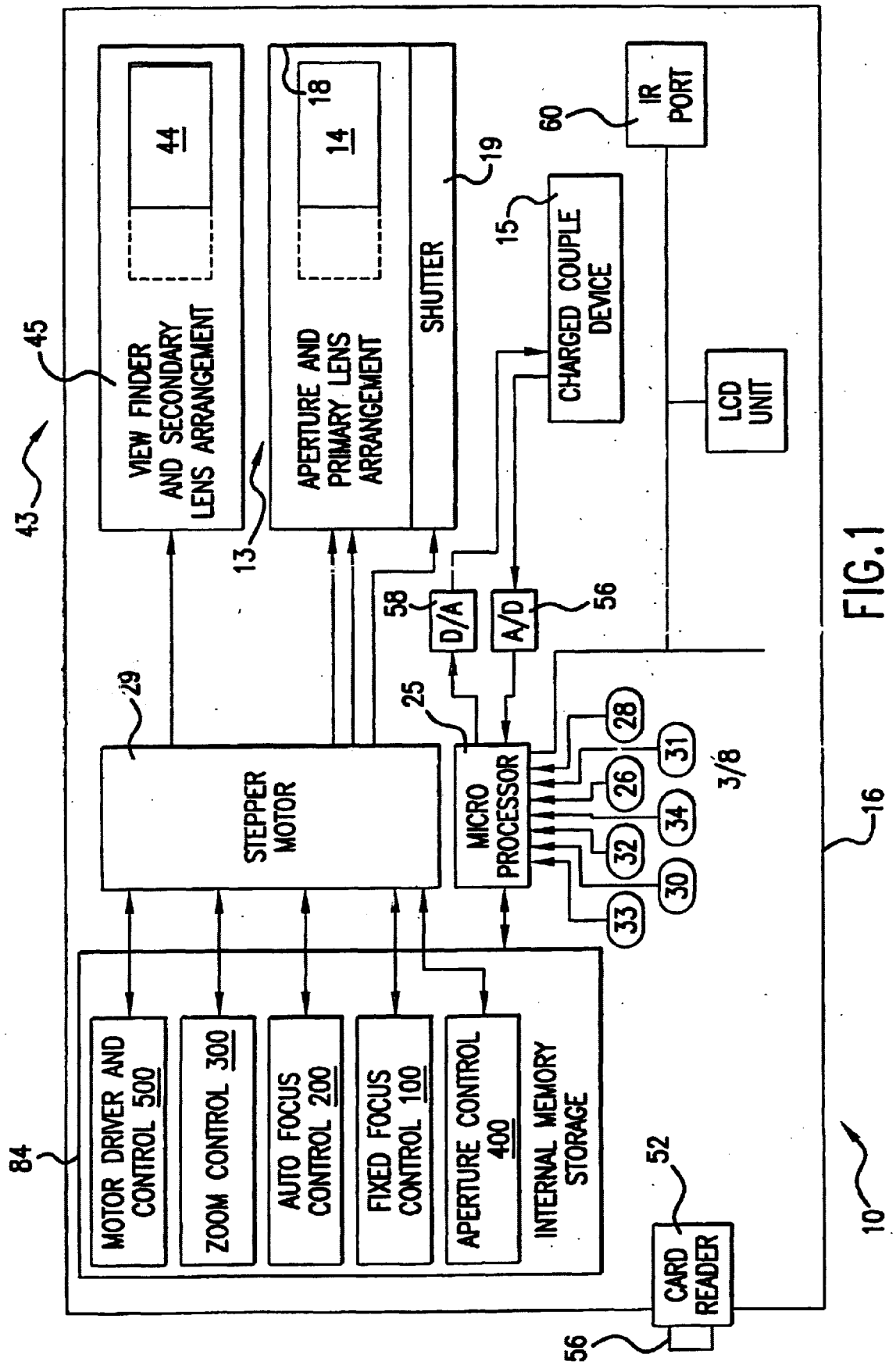
FIG. 1 is a block diagrammatic representation of a digital camera that is constructed in accordance with the preferred embodiment of the present invention.

Referring now to the drawings and more particularly to FIGS, 1–2, there is illustrated a digital camera system 8 which is constructed in accordance with the present invention. The digital camera system 8 captures and processes digital images for permanent or temporary view by a user.

Considering now the digital camera system 8 in greater detail with reference to FIGS. 1–2, the digital camera system 8 generally includes a data processing and printing system 9 for receiving and processing image data, and a digital camera 10 for capturing and storing the image data to be processed by the system 9. The data processing and printing system 9 can be configured in various hardware and software configurations that facilitates digital image processing such as a personal computer system having a processor or computer, a monitor, a digital card reader and a printer or a stand alone photo-printer having an IR port, a digital card reader and an internal micro-processor that permits image data received on a storage card module 54 or transmitted on an infrared wavelength via an IR communication channel, such as an IR channel indicated generally at 75 ( FIG. 2).

In operation, the user utilizing the digital camera 10, selects a scene to be photographed and frames and focuses the image using the various camera controls that will be described hereinafter in greater detail so that the object scene can be captured and stored when the camera 10 is activated. Once the image has been captured and stored by the camera 10, the user can select the image either by itself or with other images that have been previously captured and stored to cause them to either be transmitted to the processing system 9 via the IR channel 75 or copy them to the storage card module 54 with various instruction commands such as how many of prints of each image are to be prepared, cropping instructions, rotating instruction, thumbnail instructions and the like. The storage card module 54 can then be removed from the camera 10 and inserted in the data processing and printing system digital card reader for processing purposes. More particularly, the image information and instructions when received by the processing system 9 are acted upon resulting in the preparation of image prints in accordance with the instructions of the user as entered via the camera 10.

Referring now to the drawings and more particularly to FIG. 1, there is shown in diagrammatic representation the digital camera 10, which is, constructed in accordance with the present invention. The camera 10 is configured for use with the image processing system 9 to facilitate the review, formatting and printing of high quality digital photographs. In the preferred embodiment of the present invention, the camera 10 includes both optical and digital zooming features as well as a fixed focus feature and an automatic focus feature, each of which will be described hereinafter in greater detail when the operation of the camera 10 is described.

The fixed focus mode of operation is also aperture sensitive, allowing the camera 10 to default to the fixed focus mode of operation. In the fixed focus mode of operation, the camera 10 automatically adjusts its focal point and aperture setting relative to the amount of ambient light being received by the camera 10.

Considering the camera 10 in greater detail with reference to FIG. 1, the camera 10 generally includes a housing 16 having mounted therein a aperture/lens system or arrangement 13 that facilitates the zooming feature, aperture setting for light adjustments and the focusing features for image reproduction purposes. In this regard, the aperture/lens arrangement 13 generally includes a primary lens system indicated generally at 14 for focusing and optical zooming in and out of a scene to be captured, a shutter 19 for allowing the light indicative of the object to be captured to enter the photosensitive plane of the camera and an aperture 18 that is automatically adjusted for receiving the proper amount of light to assure proper image formation.

In order to allow the user to preview the scene to be captured, the camera 10 also includes a microprocessor 25 and liquid crystal display (LCD) unit 38 that are coupled electrically to a charged coupled device or CCD 15. The LCD unit 38 permits the user to visualize various message indications relative to camera control as well as previewing the effects of both optical and digital zooming before an image is captured. The CCD 15 is disposed in the primary light path for converting light to an electrical signal that is ultimately processed by the microprocessor 25 as will be explained hereinafter in greater detail. As best seen in FIG. 1, the primary light path extends from the aperture 18 to the charged couple device 15 via the primary lens system 14 and the shutter 19.

The microprocessor 25 and LCD unit 38 operate to provide one preview mode of operation that is substantially the same mode of operation as found in a through the lens (TTL) digital camera. That is, the user via the LCD unit 38 can view the effects of both optical zooming and digital zooming when the LCD unit 38 is placed in a power on condition. It will be appreciated however, by those skilled in the art, that in this LCD preview mode of operation, the LCD unit 38 places a significant battery drain on the electrical system of the camera 10.

The camera 10 also includes a zoom effect viewfinder arrangement 43 having a secondary lens system 44 and viewfinder 45. The viewfinder arrangement 43 operates in cooperation with a viewfinder zoom control algorithm 300, to provide the user with, in another preview mode of operation, a visualization of the object scene that will be captured. In this mode of operation, the user is able to visualize the object scene with no power applied to the LCD unit 38 to effect a significant increase in the operating period of the camera. In short then, in this viewfinder preview mode of operation, the LCD unit 38 does not exert a power drain on the electrical system of the camera 10 as the LCD unit 38 is not placed in a power on condition. A selection switch 33 allows the user to switch the operating mode of the camera 10 between the two different modes of operation, a viewfinder only mode and a LCD mode. In order to facilitate zoom in and zoom out commands, the camera 10 also includes a zoom in switch 30 and a zoom out switch 32 as best seen in FIG. 1.

A stepper motor 29 coupled between the microprocessor 25 and the primary and secondary lens systems 14 and 44 respectively, causes the respective lens systems 14 and 44 to be moved for focusing and zooming purposes. The stepper motor 29 under the control of the microprocessor 25 and a fixed focus control algorithm 100 (FIG. 5) incrementally adjusts, for a given aperture setting, the primary lens system 14 to a predetermined focal pointing setting when the camera 10 is operating in the fixed focus mode of operation. The stepper motor 29 under the control of the microprocessor 25 and the zoom control algorithm 300 also zooms the primary lens system 14 and the secondary lens system 44 over an optical zoom range between 1× magnification and 2× magnification. At the end of the optical zoom range, when the primary lens system 14 can no longer effect any greater zooming effects, the microprocessor 25 causes the stepper motor 29 to continue to move the secondary lens system 44 in such a manner as to simulate digital zooming effects that are directly viewable by the user without activating the LCD unit 38. That is, the secondary lens system 44 will continue to magnify the object scene as viewed in the viewfinder 43, even though the primary lens system 14 is no longer moving. In short then, the amount of magnification the optical viewfinder 43 will show is the product of the optical and digital zoom factors as shown in Table A.

For example, the optical zoom function has an operating range from about $Z_1$ to about $Z_n$ which is expressed in a series of finite steps as $Z_1, Z_2, Z_3, \ldots Z_n$. Thus, in optical zoom operations, the primary lens system 14 and the secondary lens system 44 move in tandem along their respective primary and secondary light paths in a series of continuous finite steps from $Z_1$ to $Z_n$ when the user zooms in to obtain a telescopic object image. Conversely, when the user zooms out to obtain a wide angle object image, the lens systems 14,44 move in an opposite direction in a continuous series of finite steps from $Z_n$ to $Z_1$.

Once the primary lens system 14 has been moved to its maximum optical zoom position at $Z_n$, no further optical zoom is possible. In this regard, if the user desires to continue to zoom in on an object image, the camera 10 automatically switches to the digital zoom mode.

In the digital zoom mode there is another series of finite magnification factor steps as $D_1, D_2, D_3, \ldots D_n$ to provide a range from about $D_1$ to $D_n$. In this mode of operation, the microprocessor 25 causes the CCD 15 to manipulate its output signal to provide the effects of digital zooming that may be observed on the LCD unit 38 if the camera is operating in the LCD active mode. The practical effects of what is viewed on the LCD unit 38 is the product of the current optical zoom factor (for example $Z_n$) and the current digital zoom factor (for example $D_n$) to provide the overall effective zoom factor of $Z_n D_n$.

To permit the user to visualize this zooming effect in the viewfinder 45, the microprocessor 25, under the control of a zoom control program 300, causes the secondary lens system 44 to continue movement along the secondary light path from the maximum optical zoom position of $Z_n$ to a maximum effective zoom position of $Z_n D_n$. In short then, as the secondary lens system 44 travels along the secondary light path, the lens moves in a series of finite steps that simulate the optical digital zoom factor products that range from $Z_1 D_1$ as a minimum effective zoom product to $Z_n D_n$ as a maximum effective zoom product.

In the preferred mode of operation, the microprocessor 25, in response to the zoom in and zoom out signals produced by the zoom in switch 30 and the zoom out switch 32 respectively, calculates the product of the current optical zoom factor and the current digital zoom factor to determine the positions that the stepper motor 29 needs to move the respective primary lens 14 and secondary lens 44. Thus for example, if the current optical zoom factor position is $Z_4$ and the current digital zoom factor position is $D_2$ the microprocessor 25 will cause the secondary lens system 44 to move to a position that simulates the effective optical digital zoom product of $Z_4D_2$.

As mentioned earlier Table A illustrates the effective zoom factors.

TABLE A

| Optical Zoom | Digital Zoom | Effective Zoom Product |
|---|---|---|
| Z1 | D1 | Z1D1 |
| Z2 | D1 | Z2D1 |
| Z3 | D1 | Z3D1 |
| . | . | . |
| . | . | . |
| . | . | . |
| ZN | D1 | ZND1 |
| ZN | D2 | ZND2 |
| . | . | . |
| . | . | . |
| . | . | . |
| ZN | DN | ZNDN |

Table B illustrates a series of different effective zoom magnification factors based on current optical zoom magnification factors and current digital zoom factors.

TABLE B

| Optical Zoom | Digital Zoom | Effective Zoom |
|---|---|---|
| 1X | 1X | 1X |
| 1.5X | 1X | 1.5X |
| 2X | 1X | 2X |
| 2X | 1.5X | 3X |
| 2X | 2X | 4X |

From the foregoing, it should be understood by those skilled in the art that this approach improves ease of use for the user as the effects of optical zoom and digital zooming can be viewed through the viewfinder 43 or in the alternative, on the LCD unit 38 if the user so chooses to activated this device. As a further benefit, the use of the viewfinder 43 and secondary lens system 44 masks the need to know when one is optical zooming and digital zooming which concepts are difficult for the average user to comprehend.

Although in the preferred mode of operation the camera 10 has been described as including a stepper motor 29 to effect lens movements, those skilled in the art will appreciate that other forms of motive means such as ac and dc motors can be utilized to effect such movement. Thus, there is no intention of limiting the scope of the present invention to merely a stepper motor.

Although a two-switch arrangement has been shown in the preferred embodiment of the present invention, it will also be appreciated by those skilled in the art that different switch arrangements may be utilized. For example a four to six switch arrangement could provide separate switches for optical zoom in, optical zoom out, digital zoom in, digital zoom out, viewfinder mode, LCD mode functions. As another example a single zoom in zoom out switch could be coupled with a three-switch arrangement to select an optical zoom mode, a digital zoom mode and a LCD mode, where the viewfinder mode would be a default mode. Thus, as many different types and kinds of switches as well as menu selection functions are contemplated within the true scope of the present invention there is no intention of limiting the invention to the switch arrange as shown and described.

From the foregoing, it should be understood by those skilled in the art that this approach improves ease of use for the user as the effects of optical zoom and digital zooming can be viewed through the viewfinder 43 or in the alternative, on the LCD unit 38 if the user so chooses to activated this device. As a further benefit, the use of the viewfinder 43 and secondary lens system 44 masks the need to know when one is optical zooming and digital zooming which concepts are difficult for the average user to comprehend.

Before describing the zooming features in greater detail it may be beneficial to review the concepts of optical and digital zooming. Optical zooming is the traditional method of zooming, where the primary lens system 14 is moved in such a way that the object of a scene to be photographed is viewed in a magnified manner via the LCD unit 38, and thus appears closer to the user in the viewed scene.

Digital zooming is another form of zooming that is only available in a digital camera. Digital zooming is effected by a series of steps that include:

1. converting light via a charged coupled device 15 into an electrical analog signal that is indicative of the captured image;
2. converting the analog signal into a digital signal that is also indicative of the captured image;
3. coupling the digital signal to internal microprocessor 25 for storage;
4. processing zooming commands initiated by the activation of zooming switches, such as a zoom in switch 30 and a zoom out switch 32;
5. sending a digital zoom command to the charged coupled device 15; and
6. converting the digital command into an analog signal via a digital to analog converter 58 that causes the charged couple device 15 to crop the image capture area so that only a subset of the image pixels are stored in an available storage or recording medium, such as on a removable memory card 54 or in an internal memory storage device 84 as illustrated in FIG. 1.

In this manner, when a non cropped image, one that is derived from the full image pixel area of the charged couple device 15, and a cropped image are displayed on the LCD unit 38, the cropped image will appear magnified-digitally zoomed.

Optical zoom appears smooth in operation as the stepper motor 29 effects movement of the primary lens system 14 in a substantially continuous fashion in small incremental steps that are masked to human observation. Digital zooming on the other hand is substantially different requiring substantial microprocessor time.

In view of the large amounts of microprocessor time required to implement digital zooming, prior known camera that provide both optical zoom and digital zoom have integrated the two zooming features in one of two ways:

In a first technique, the camera utilizes optical zoom until the primary lens system reaches it maximum zoom capability, and then digital zoom is activated and observed via a LCD unit in n incremental steps. This approach requires that at least two control button, one for zoom in and one for zoom out in the digital zoom mode of operation.

In another technique, the optical zoom and the digital zoom functions are separated so that a user can set the optical zoom at any setting within its operating range and the set the digital zoom to any of the n available settings within its range. The effective zoom is then the product of the optical zoom and the digital zoom settings. This technique then requires three or four controls—zoom in, zoom out, and digital zoom which can optionally be further separated into zoom in and zoom out.

Figure 6:
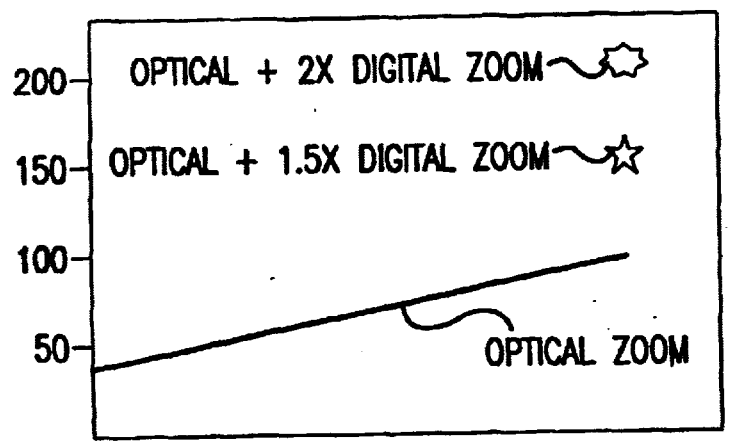
FIG. 6 is a graphical representation of a prior art digital zoom and optical zoom range in a two-control button system.

FIG. 6 illustrates in a graphical sense the first technique. In this regard, it can be seen in FIG. 6 that the zoom coverage is continuous across the optical zoom range of 38–105. However, a jump occurs to the 105×1.5 or 158 range, and then to the 105×2 or 210 range. In short then, with this technique, the user does not have full use of the zoom range of 38 to 210.

Figure 7:
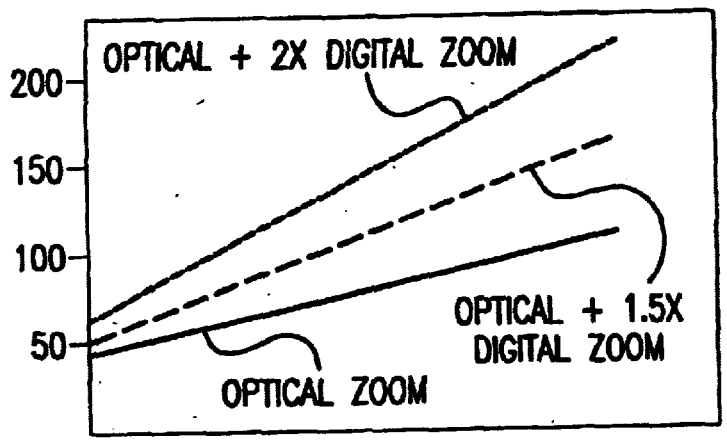
FIG. 7 is a graphical representation of another prior art digital zoom and optical zoom range in a three or four-control button system.

FIG. 7 illustrates in a graphical sense the second technique. In this approach the zoom coverage is continuous for any zoom setting between 38 and 210 utilizing both the optical zoom feature and the digital zoom feature. For example, if the zoom setting of 100 is considered relative to FIG. 7, it should be obvious to one skilled in the art that three different approaches can be implemented to achieve this setting:

1. Optical zoom at 100;
2. Optical zoom at 66 and digital zoom at 1.5×; and
3. Optical zoom at 50 and digital zoom at 2×.

From the foregoing, it should be understood that the user is provided with too much flexibility. That is the user is able to compromise image quality by being too flexible because of the multiple methods of achieving the same zoom setting. This flexibility is confusing to a novice user familiar with PAS camera and may lead to a user lacking a proper understanding of the differences between optical zooming and digital zooming features.

In order to overcome the problems associated with integrated optical zoom and digital zoom, the camera 10 only includes two-control switches—a zoom in switch 30 and a zoom out switch 32. The activation of either of zoom switches 30 and 32 causes the microprocessor 25 to execute another zoom control algorithm 1200.

Figure 8:
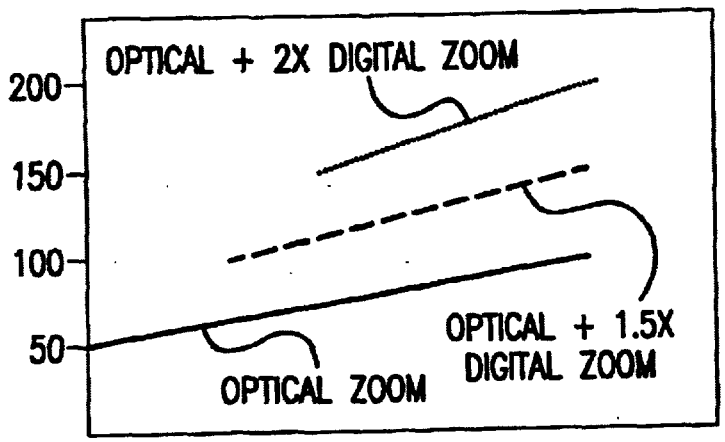
FIG. 8 is a graphical representation of the digital and optical zoom range of the present invention illustrating the smoothing transition over the entire range in a two-control button system.
Figures 12, 12A:
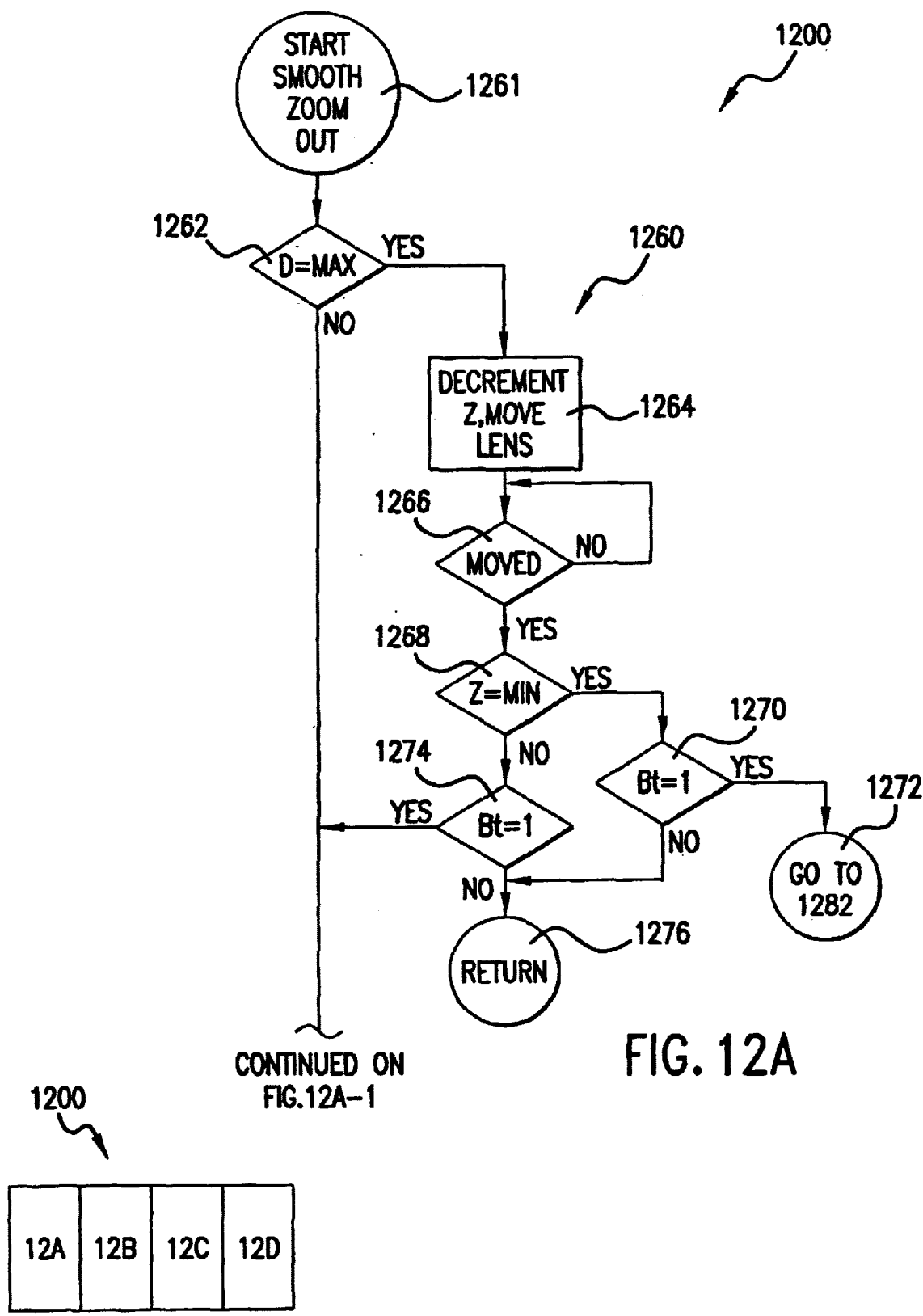
FIG. 12 is a high-level zoom control algorithm implemented in the digital camera of FIG. 1.
Figure 12B:
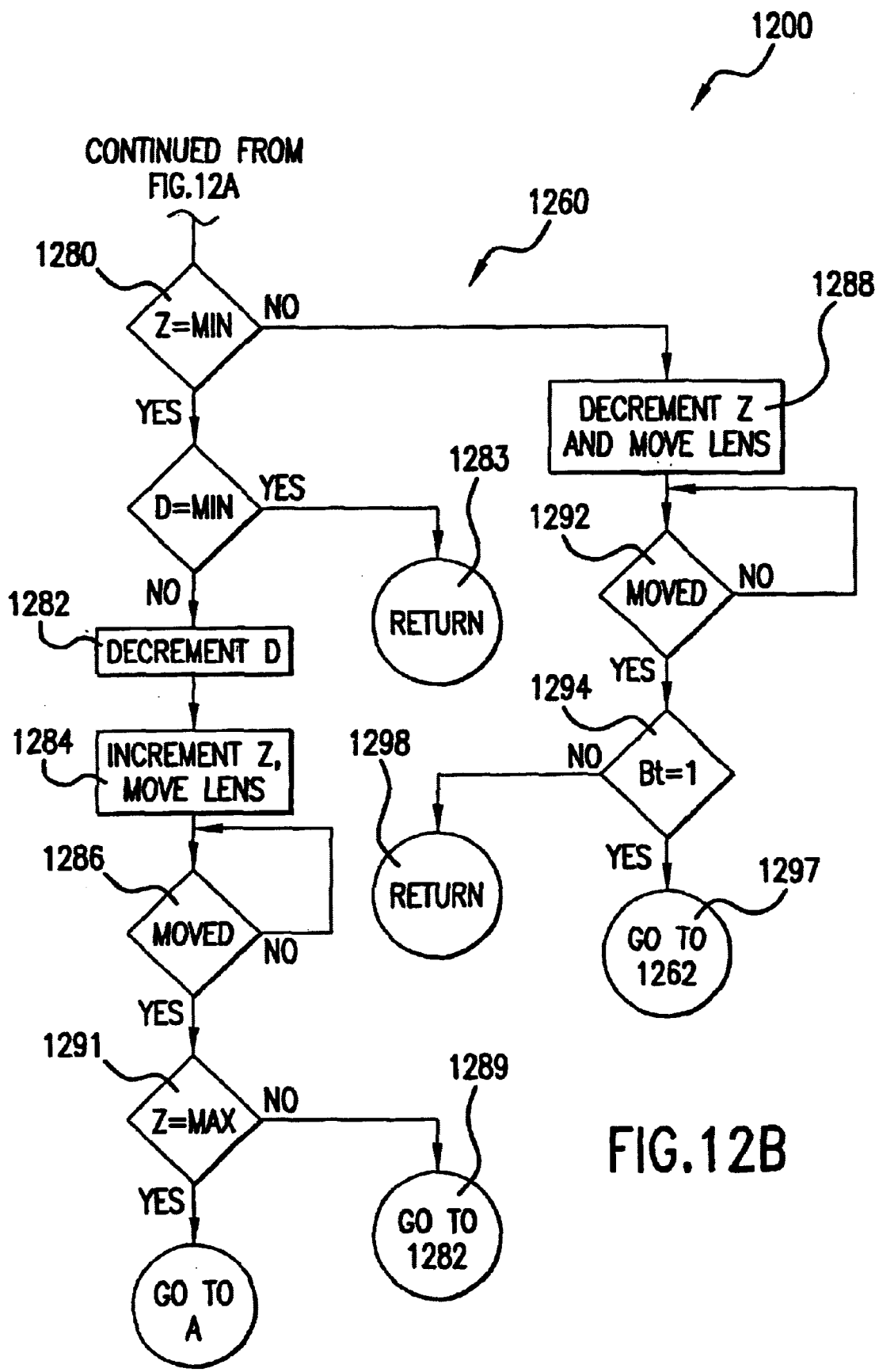
Figure 12C:
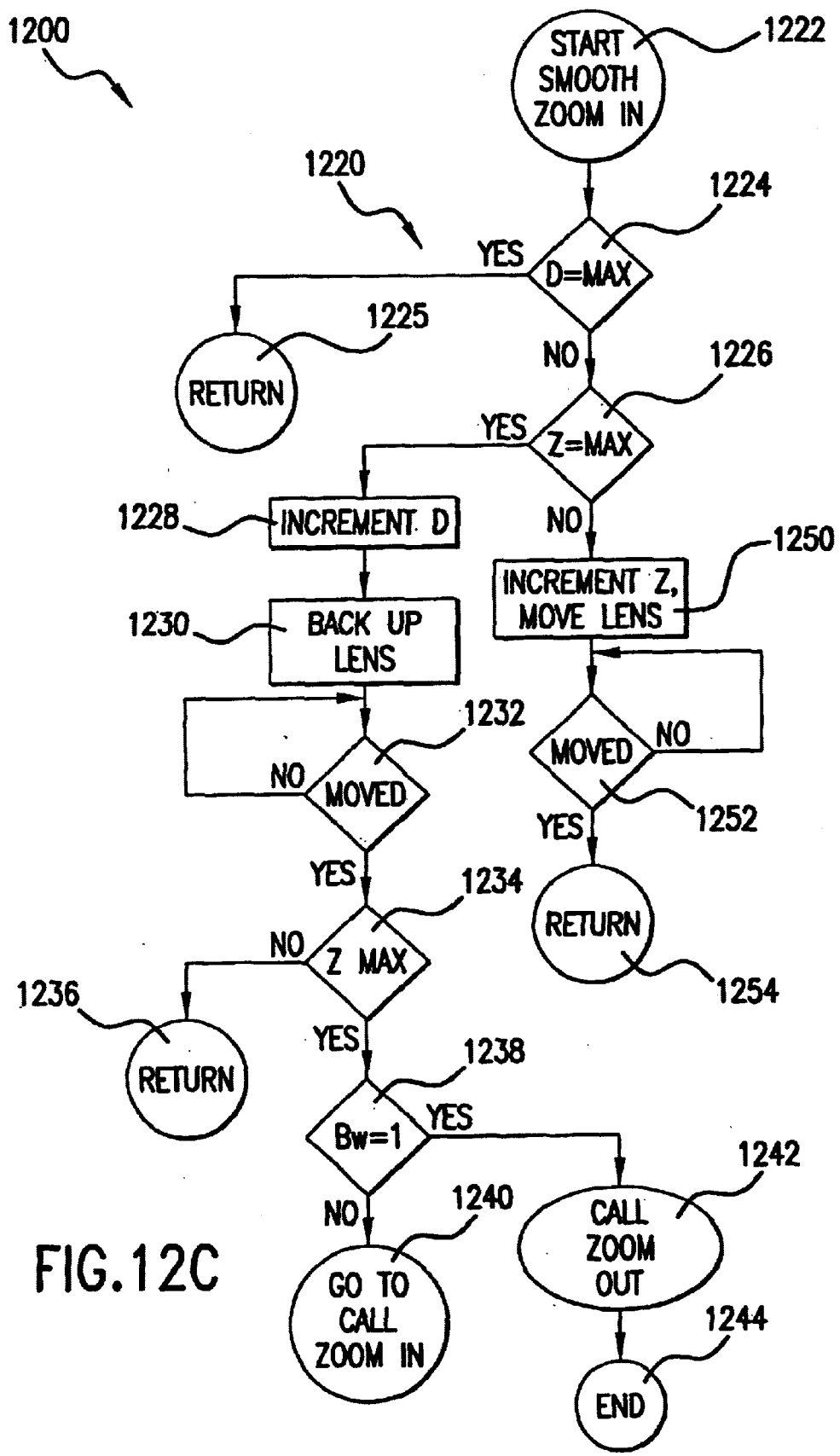
Figure 12D:
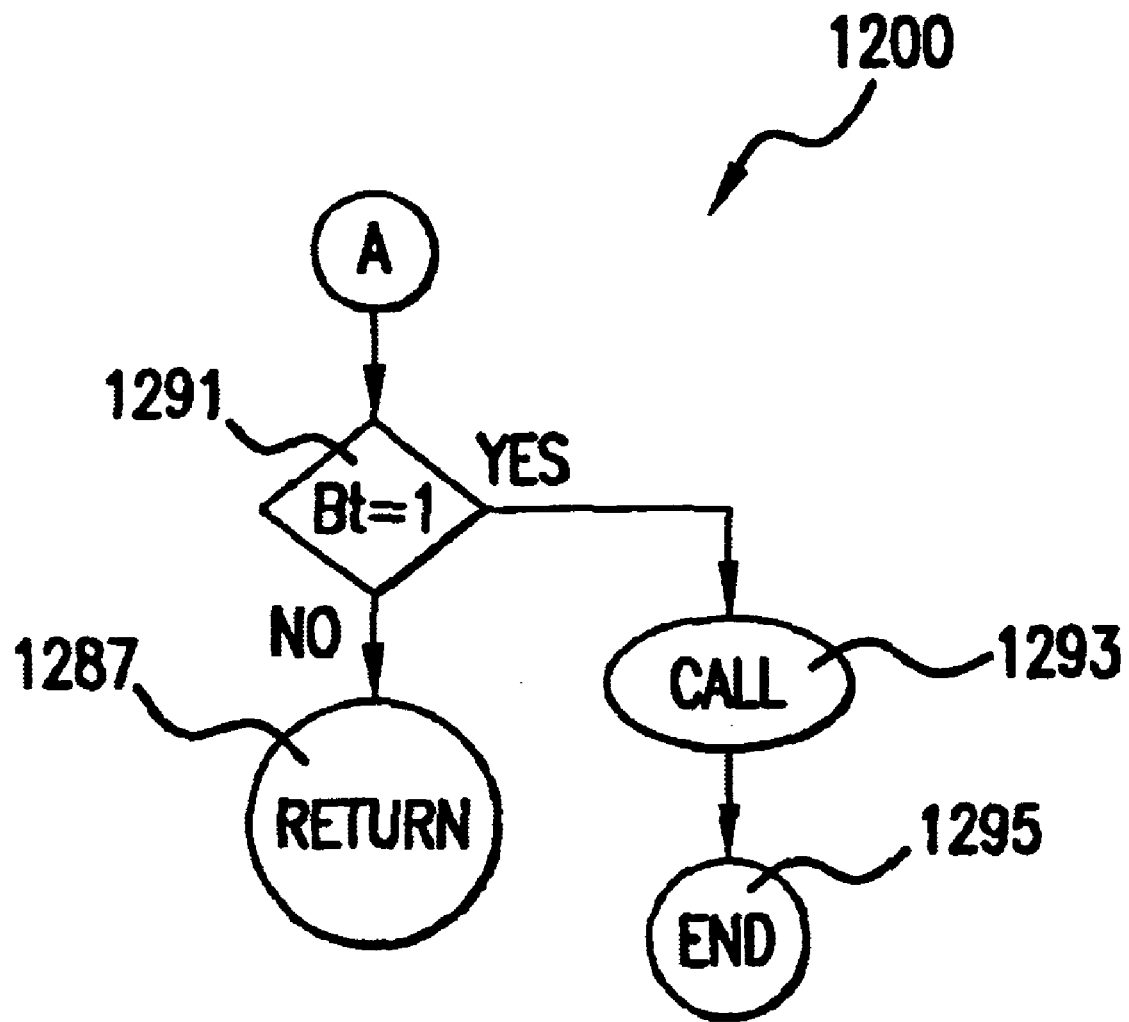

Considering now the zoom control algorithm 1200 in greater detail, with reference to FIGS. 8 and 12, a set of variables need to be defined:

$Z_w$=the shortest setting of the optical zoom range.
$Z_t$=the longest setting of the optical zoom range.
$D_1$=the first step of the digital zoom range.
$D_2$=the second step of the digital zoom range.
$D_n$=the nth step of the digital zoom range.
$B_w$=the switch or button control for zooming in.
$B_t$=the switch or button control for zooming out.

The zoom control algorithm 1200 comprises a smooth zoom in operation 1220 and a smooth zoom out operation 1260 that operate in the following manner in view of the variable definitions set forth above:

1. When the user activates the zoom out switch $B_t$, the optical zoom feature is enabled in the optical zoom range of between about $Z_w$ and about $Z_t$.
2. When the primary lens system 14 reaches its maximum zoom range of about $Z_t$ and the user continues to depress the zoom out switch $B_t$, the algorithm 400 causes the primary lens system 14 to step back to the point $Z_t/D_1$ and activates the first digital zoom step of $D_1$.
3. As the user continues to depress the zoom out switch $B_t$, the primary lens system 14 is again advanced until it reaches its maximum range position of about $Z_t$ while the first digital zoom step of $D_1$ remain active. The combined zoom product is thus, $Z_tD_1$.
4. When the primary lens system 14 reaches its maximum zoom range of about $Z_t$ and the user continues to depress the zoom out switch $B_t$, the algorithm 1200 causes the primary lens system 14 to step back to the point $(Z_t/D_1)/D_2$ and activates the second digital zoom step of $D_2$.
5. As the user continues to depress the zoom out switch $B_t$, the primary lens system 14 is again advanced until its reaches its maximum range of about $Z_t$ while the second digital zoom step of $D_2$ remain active. The combined zoom product is thus, $Z_tD_2/D_3$.
6. When the primary lens system 14 reaches its maximum zoom range of about $Z_t$ and the user continues to depress the zoom out switch $B_t$, the algorithm 1200 causes the primary lens system 14 to step back to the point $(Z_t/D_2)/D_3$ and activates the third digital zoom step of $D_3$.
7. The above described advance, backup, advance steps are repeated until the point of $Z_tD_n$ is reached which point is the maximum zoom range of the optical zoom and the digital zoom in combination.
8. When the user depresses the zoom in switch $B_w$, the algorithm unravels the above-described steps in reverse order.

From the foregoing, it will be appreciated by those skilled in the art that the result is a continuous zoom range from $Z_w$ all the way to $Z_tD_n$ without any gaps in the zoom coverage as best seen in FIG. 6. This result is achieved with the use of the standard two-button scheme of a zoom in switch, such as the zoom in switch 30 and a zoom out switch, such as the zoom out switch 32. In short then, image quality is maximized for every setting because optical zoom is always used whenever possible over the digital zoom ranges.

Considering now the zooming features of the camera 10 in still greater detail, the camera 10 includes a zoom in switch 30 and a zoom out switch 32 that cooperate with a zoom control algorithm 300 (FIG. 3) to effect a continuous zoom range over both the optical zoom range and the digital zoom range. In this regard, the optical zoom is always used whenever possible over the digital zoom.

Figures 3, 3A:
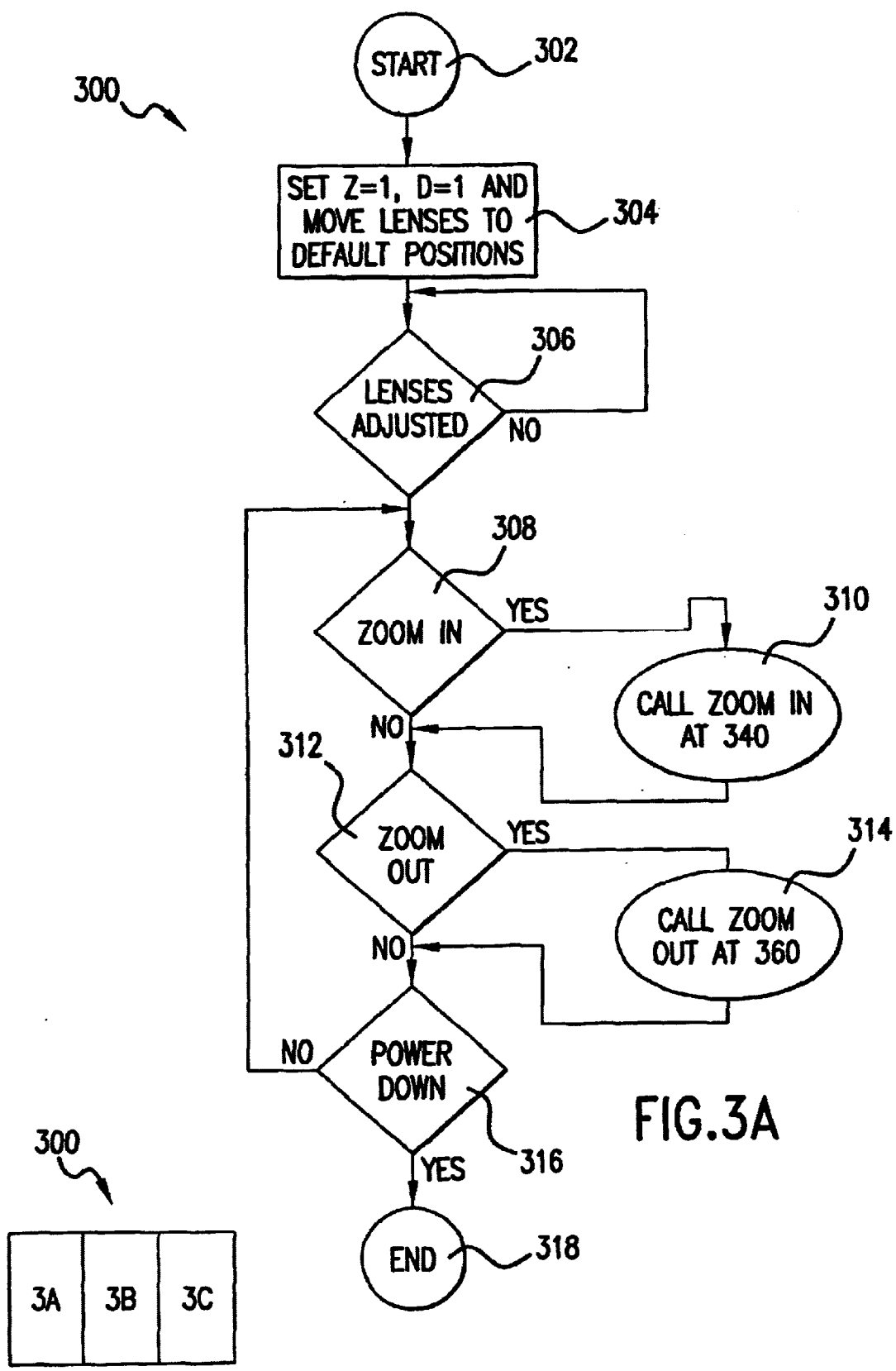
FIG. 3 is a high-level zoom control flow chart illustrating the operational steps of the digital camera of FIG. 1.
Figure 3B:
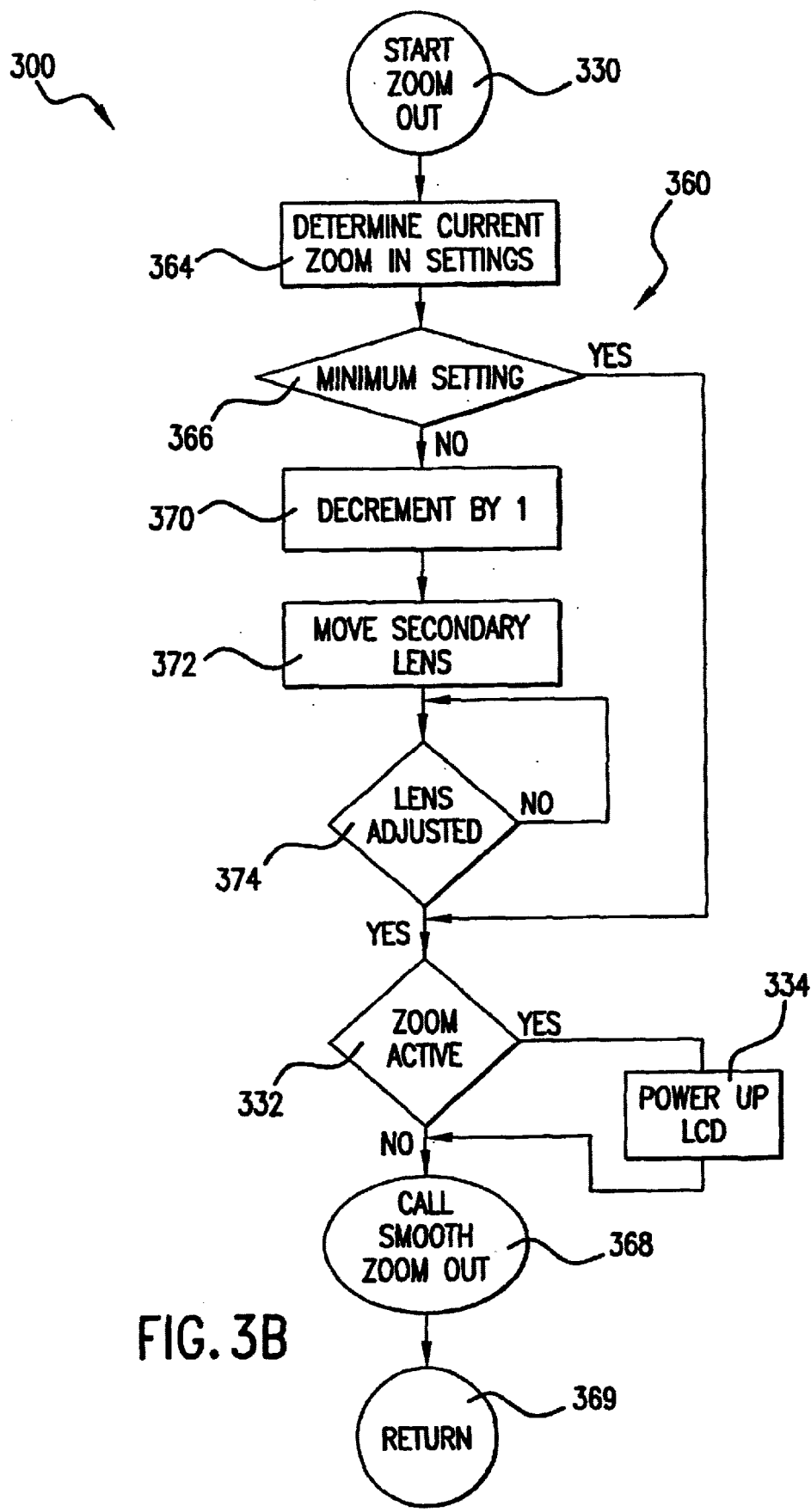
Figure 3C:
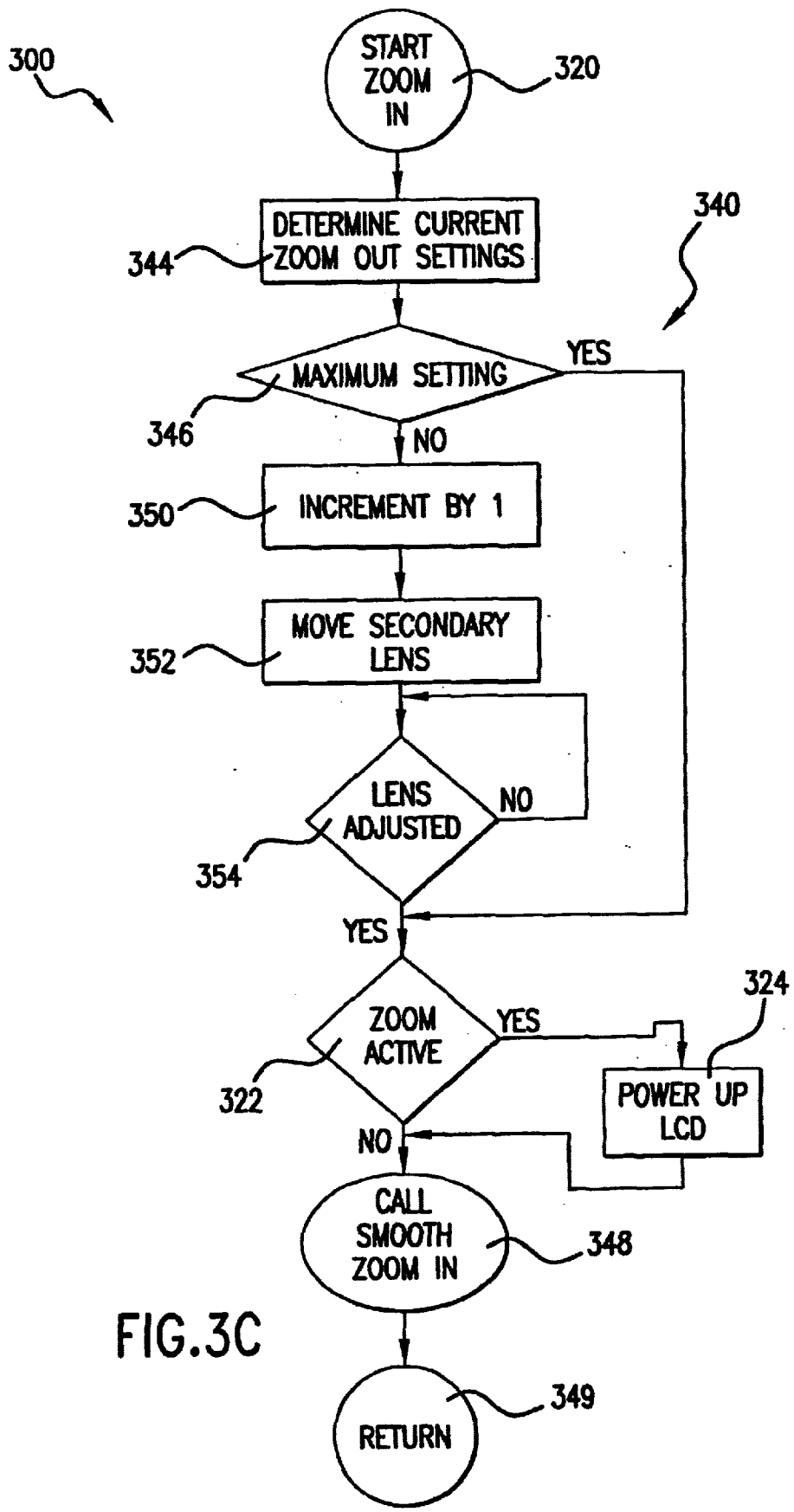

Considering now the viewfinder zooming algorithm 300 in greater detail with reference to FIG. 3, the zooming algorithm 300 begins at a start command 302 whenever power is applied to the camera 10. The program immediately advances to a command step 304 that sets the optical zoom factor Z to a default setting of $Z_w$ or 1× magnification and the digital zoom factor D to a default setting of $D_1$ or 1× magnification causing the primary lens 14 and the secondary lens 44 to be moved to their default positions. Next the program advances to a determination step 306 to wait for the primary lens 14 and the secondary lens 44 to be adjusted to their default positions by the stepper motor 29.

Once the primary lens 14 and the secondary lens 44 have been adjusted to their default positions, the program proceeds to a determination step 308 to determine whether or not the user has activated the zoom in switch 30. If the user has activated the zoom in switch 30, the program goes to a call command 310 that calls a zoom in subroutine 340 that will be described hereinafter in greater detail. If the user has not activated the zoom in switch 30, the program advances to a decision step 312 to determine whether or not the user has activated the zoom out switch 32. It should be noted that after the zoom in subroutine 340 has been executed the program then advances to the decision step 312.

At the determination step 312, if a determination is made that the user has not activated the zoom out switch 32, the program goes to a decision step 316 to verify whether or not the user desires to power down the camera 10. If at the determination step 312 a determination is made that the user has activated the zoom out switch 32, the program proceeds to a call command 314 that calls a zoom out subroutine 360 that will be described hereinafter in greater detail. After the zoom out subroutine 360 has been executed the program proceeds to the determination step 316 to determine whether the user has initiated a power camera down sequence.

If the user desires to power down the camera 10, the program goes to an end step 318 and the camera 10 is powered down. If the user has not initiated a power down sequence, the program returns to the determination step 308 and proceeds as previously described. From the foregoing, it will be understood by those skilled in the art that the zoom control algorithm 300 will proceeds from steps 308 to 316 to effect zoom in and zoom out operations until such time as the user desires to power down the camera 10.

Considering now the zoom in subroutine 340 in greater detail with reference to FIG. 3, when the call command 310 is executed the program proceeds to a start command at 320 that initiates the zoom in subroutine 340. From the start command 320, the program advances to a command step 344 that determines and stores the current zoom out range value. In this regard, the zoom out function has a range from a minimum combined optical digital zoom factor of $Z_w D_1$ or $Z_1 D_1$ to a maximum combined optical digital zoom factor of $Z_t D_n$ or $Z_n D_n$.

From step 344, the program proceeds to a decision step 346 to verify whether or not the current optical digital zoom factor is set to a maximum value of $Z_n D_n$. If the current optical digital zoom factor product is set to a maximum value, the camera system is in a fully zoom in position and no further telescopic effects are possible. In this regard, the program proceed to a decision step 322 to determine whether the user has activated the zoom mode control switch 33 to place the camera 10 in the LCD mode. If the user has activated the LCD mode switch 33, the program proceed to a command step 324 that causes the LCD unit 38 to be powered up. After the LCD unit 38 has been powered up the program advances to a call command 348 that calls the subrountine smooth zoom in 1220 that will be described hereinafter in greater detail. If a determination is made at the decision step 322 that the user has not activated the LCD mode switch 33, the program proceeds directly to the call command 348 to call the smooth zoom in subroutine 1220.

Once the smooth zoom in subroutine 1220 has been executed, the program advances to a return step 349 that returns the program to the zoom control algorithm by exiting the call step 310 and advancing to the decision step 312.

Considering now the zoom out subroutine 360 in greater detail with reference to FIG. 3, when the call command 314 is executed the program proceeds to a start command at 330 that initiates the zoom out subroutine 360. From the start command 330, the program advances to a command step 364 that determines and stores the current zoom in range value. In this regard, the zoom in function has a range from a maximum combined optical digital zoom factor of $Z_t D_n$ or $Z_n D_n$ to a minimum combined optical digital zoom factor of $Z_w D_1$ or $Z_1 D_1$.

From step 364, the program proceeds to a decision step 366 to verify whether or not the current optical digital zoom factor is set to a minimum value of $Z_1 D_1$. If the current optical digital zoom factor product is set to a minimum value, the camera system is in a fully zoom out position and no further wide angle effects are possible. In this regard, the program proceed to a decision step 332 to determine whether the user has activated the zoom mode control switch 33 to place the camera 10 in the LCD mode. If the user has activated the LCD mode switch 33, the program proceed to a command step 334 that causes the LCD unit 38 to be powered up. After the LCD unit 38 has been powered up the program advances to a call command 368 that calls the subrountine smooth zoom out 1260 that will be described hereinafter in greater detail. If a determination is made at the decision step 332 that the user has not activated the LCD mode switch 33, the program proceeds directly to the call command 368 to call the smooth zoom out subroutine 1260.

Once the smooth zoom in subroutine 1260 has been executed, the program advances to a return step 369 that returns the program to the zoom control algorithm by exiting the call step 314 and advancing to the decision step 316. The zoom control program 300 then proceeds as described previously.

From the foregoing it should be understood by those skilled in the art that the zoom in subroutine 340 increases the zoom magnification factors so long as the user continues to hold the zoom switch 30 in an increase zooming state. On the other hand, if the user is attempting to decrease zooming, zoom out subroutine 360 decreases the zoom magnification factors so long as the user continues to hold the zoom out switch 32 in a decrease zooming state. In short then, the user can zoom in or zoom out visualizing the effects of both optical and digital zooming either using the viewfinder 45 or the LCD 38 depending upon which operating mode the user has selected.

Considering now the smooth zoom in subroutine 1220 in greater detail with reference to FIG. 12, the subroutine 1220 is entered via the call command 348 in the zoom control algorithm 300. The subroutine 1220 begins at a start command 1222 and proceeds to a decision step 1224 to determine whether the digital zoom magnification factor D has been set to a maximum value of $D_n$. If the digital zoom magnification factor D has not been set to the maximum value, no further telescopic zooming is possible, in this regard, the subroutine proceeds to a return command at step 1225 directing the program to the zoom in subroutine step 349 where the program proceeds as described previously. If the digital zoom magnification factor D has not been set to the maximum value, the program proceeds to a decision step 1226 to determine whether or not the optical zoom magnification factor Z is set to its maximum value of $Z_t$.

If the optical zoom magnification factor Z has not been set to a maximum value, the smoothing algorithm 1220 causes the primary lens system 14 to step forward increasing the magnification by one incremental step via a command step 1250. In this regard, the command step 1250 causes the primary lens system 14 to move the incremental step. The program then proceeds to a decision step 1252 to wait for the primary lens 14 to be advanced. Once the primary lens has been advanced the program goes to a return step 1254 returning the program to the zoom in subroutine at step 349 where the program proceeds as described previously.

If the optical zoom magnification factor Z has been set to a maximum value any increase in magnification will be caused digitally. In this regard, the program goes to a command step 1228 from the decision step 1226 to increase the digital zoom factor by one. To effect a smooth transition to the new optical digital zoom product, the program proceeds to a command step 1230 that causes the primary lens 14 to backoff one incremental step or position. Next the program proceeds to a decision step 1232 to wait for the primary lens 14 to be adjusted.

Once the primary lens system 14 has been adjusted the program goes to a decision step 1234 to determine whether the primary lens 14 is positioned at its maximum setting. In this case, since the primary lens has been back off one incremental step from its maximum setting, the maximum optical lens position has not been achieved. Thus, the program proceeds from the decision step 1234 to a return step 1236 causing the program to exit the zoom in subroutine by advancing to step 349 where the program proceeds as described previously.

If a determination is made at step 1234 that the optical zoom factor Z is set to a maximum optical magnification setting, the program advances to a decision step 1238 to determine whether the user has activated the zoom out switch $B_w$ indicated at 32 in FIG. 1. If the user has not activated the zoom out switch 32, the program advances to a return step 1240 that returns the subroutine to the zoom in algorithm at step 349 where the program proceeds as described previously.

If a determination is made at decision step 1238 that the user has activated the zoom out switch 32 so that $B_w$ is set active, the subroutine goes to a call command 1242 that calls the smooth zoom out subroutine 1260. From the call command 1242 the smooth zoom in subroutine 1220 ends at step 1244.

Considering now the smooth zoom out subroutine 1260 in greater detail, the subroutine 1260 is entered at a start command 1261 from either the call command 1242 from the smooth zoom in subroutine 1220 or from the zoom out subroutine 360 from the call step 368. In either event, the program proceeds from the start step 1261 to a decision step 1262 to determine whether or not the digital zoom factor D has been set to a maximum magnification value of $D_n$.

If the digital zoom factor D has not been set to its maximum telescopic value, the program advances to a decision step 1280 to verify whether the optical zoom factor has been set to its minimum value of $Z_w$ or $Z_1$. If the optical zoom factor Z is set to its minimum value any further decrease in the magnification of the object scene can only be effected by decreasing the digital zoom factor D. In this regard, the subroutine goes to a decision step 1281 to determine whether the digital zoom factor D has been set to its minimum value of $D_1$. If the digital zoom factor D is set to its minimum value, the combined optical digital zoom product is 1× magnification and no further wide angle zoom is possible since the camera is set to it minimum wide angle setting. In this regard, the program proceeds to a return step 1283 that returns the program to the zoom control algorithm 300 at step 369 where the program continues as described previously.

If a determination is made at step 1281 that the digital zoom factor D is not set to its minimum value of $D_1$, the program goes to a command instruction 1282 that decrements the digital zoom factor by one incremental step. In order to smooth the transition from the one digital setting to the other, the program advances to a command step 1284 that increases the optical zoom factor setting by one incremental step while instructing the stepper motor 39 to advance the primary lens position one incremental step. The program then proceeds to a decision step 1286 to wait for the primary lens 14 to move to its new position.

After the primary lens 14 has moved to its new position, the program goes to a decision step 1287 to determine whether the optical zoom factor has been set to a minimum setting. In this case, since the optical zoom factor has just been incremented from its minimum setting the program goes to a return step 1289 that returns the subroutine to the zoom out subroutine at step 369 where the program proceeds as described previously.

If at decision step 1287 it is determined that the optical zoom factor has not been set to a minimum setting, the program advances to a decision step 1291 to determine whether the user has activated the zoom in switch $B_t$ indicated at 30 in FIG. 1. If the zoom in switch 30 has been activated so $B_t=1$, the program goes to a call command 1293 that calls the smooth zoom in subroutine 1220 causing the program to advance to the start command 1222 as described previously.

If the zoom in switch 30 is not active, the program proceeds to a return command 1297 advancing the subroutine to the zoom out subroutine 360 at step 369 as described previously.

Considering again the decision step 1280 if a determination is made that the optical zoom factor Z is not set to a minimum value of $Z_1$ the optical zoom can be decreased by an incremental step. In this regard, the program proceeds to a command step 1288 that decreases the optical zoom factor by one increment and causes the stepper motor 39 to move the primary lens 14. The program then advances to a decision step 1292 to wait for the primary lens system 14 to be adjusted.

Once the primary lens system 14 has been adjusted, the program proceeds from step 1292 a decision step 1294 to determine whether the user has activated the zoom in switch $B_t$ indicated at 30 in FIG. 1. If the user has not activated the zoom in switch 30, the program return to the zoom out subroutine 360 executing a return step 1298. Conversely, if the user has activated the zoom in switch 30, the program advances to the call step 1297 and proceeds as described previously.

Considering now the focusing of the camera 10 in greater detail with reference to FIG. 1, the camera 10 includes a fixed focus mode of operation as well as an automatic focus mode of operation. In the fixed focus mode, the camera 10 as will be explained hereinafter in greater detail automatically adjusts its focal point and aperture setting relative to the amount of ambient light being received through the primary lens system 14 of the camera 10.

In order to facilitate the fixed focus mode and the automatic focus modes of operation, the camera 10 includes the adjustable aperture 18 that cooperates with the primary lens arrangement 14 and the shutter 19 for admitting light to the charged couple device 15 for a predetermined period of time. The charged couple device 15 converts the light that is received into an electrical signal that is indicative of an object to be photographed as well as the ambient light conditions surrounding the object.

Figure 4:
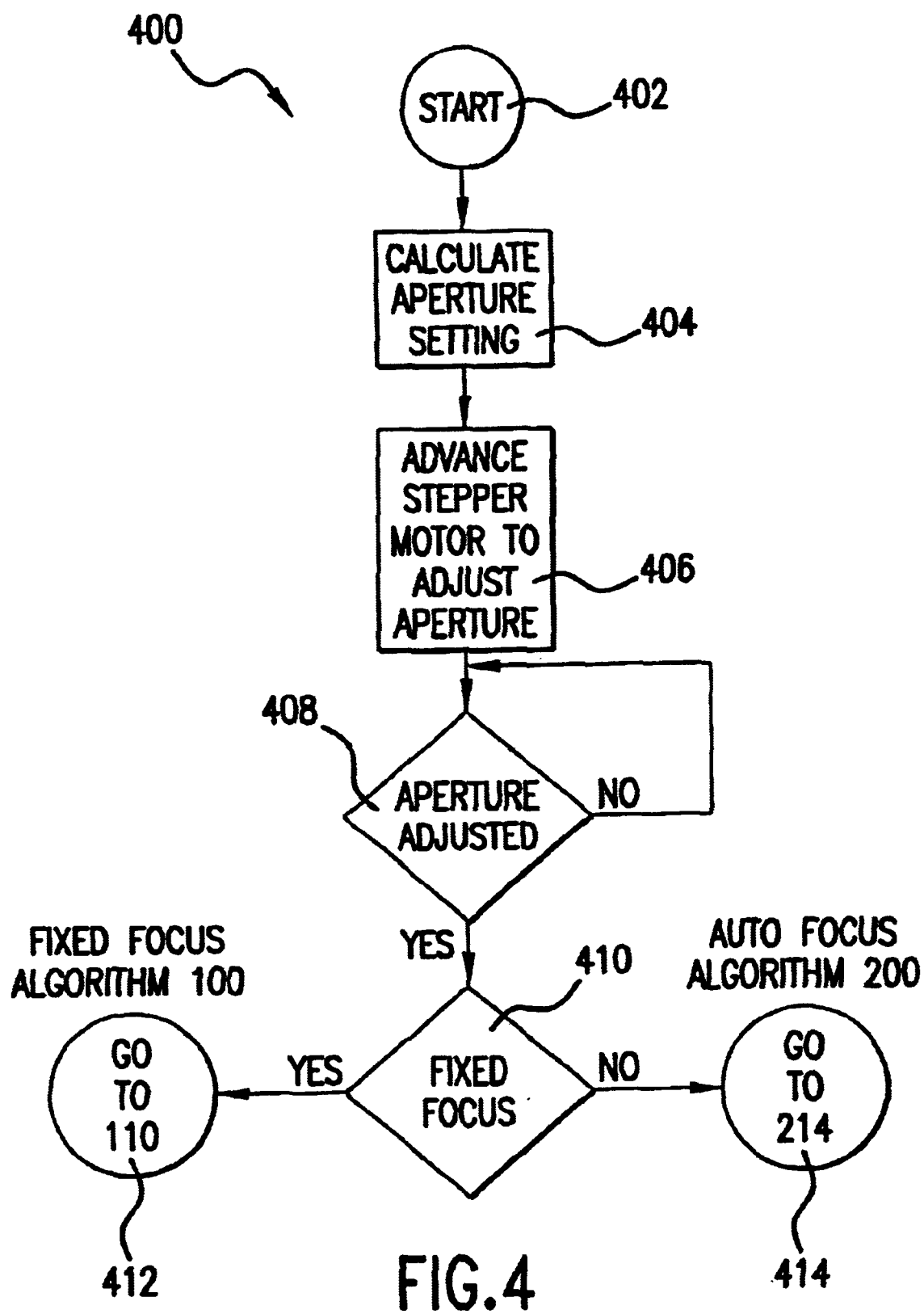
FIG. 4 is a high-level aperture setting flow chart illustrating the operational steps of the digital camera of FIG. 1.

An analog to digital converter 56 converts the electrical signal generated by the charged couple device 15 into a digital signal that is coupled to the microprocessor 25. The microprocessor 25 through various ones of the algorithms embodied therein, as will be explained hereinafter in greater detail, automatically places the camera 10 in the fixed mode of operation upon the camera being activated. The microprocessor 25 also causes the aperture 18 of the camera 10 to be adjusted to an optimal setting and then automatically adjusts the focal point of the camera 10 to facilitate ease of use by the camera user. More specifically these automatic adjustments and setting are achieved through an a fixed focus mode algorithm 100 (FIG. 5), an automatic focus mode algorithm 200 (FIG. 11) and an aperture control algorithm 400, (FIG. 4) each of which, will be described hereinafter in greater detail.

Figure 5:
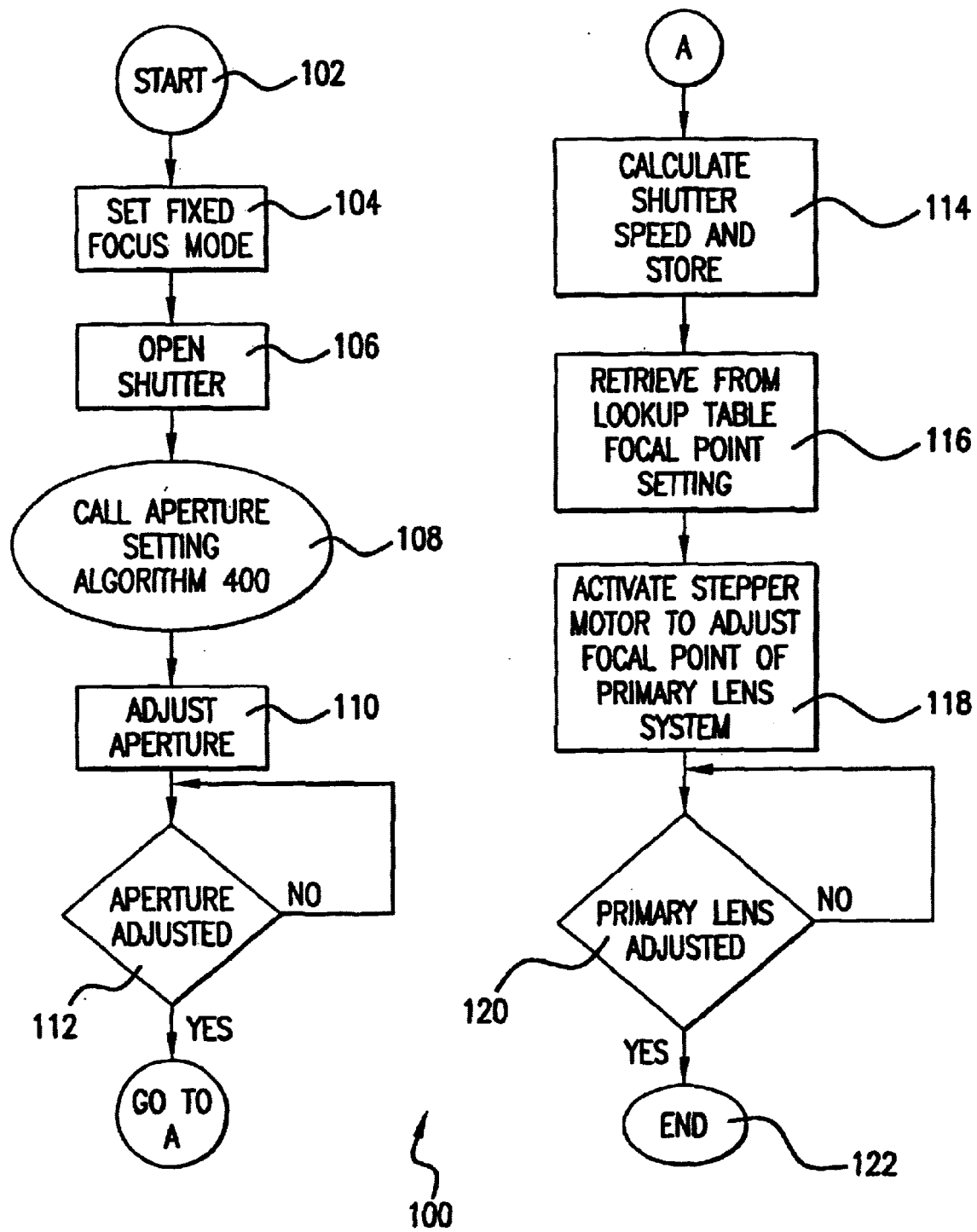
FIG. 5 is a high-level fixed focus mode flow chart illustrating the operational steps of the digital camera of FIG. 1.

Considering now the fixed focus mode algorithm 100 in greater detail with reference to FIG. 5, the fixed focus mode algorithm 100 is responsive to the optimal setting of the aperture 18 as determined by the aperture control algorithm 400, and automatically moves the primary lens system 14 to a predetermined focal point. In the fixed focus mode of operation, the following operational steps are achieved:

1. The algorithm 100 causes the shutter 19 to be opened allowing the microprocessor 25 to receive a digital signal indicative of the ambient lighting conditions.
2. The algorithm 100 based on the determined ambient lighting conditions determines an appropriate shutter speed and aperture size for facilitating the capturing of a properly exposed image object.
3. The algorithm 100 based on the determined aperture size causes the primary lens 14 to be moved to a predetermined focal point for proper focusing of the image object to be captured. Each aperture size has a corresponding focal point. Thus, since there are three different aperture size settings there are three corresponding focal point settings in the fixed focus mode of operation. A look up table stored in the internal memory storage device 84 is accessed by microprocessor 25 so that it retrieves a proper focal point setting based upon the aperture size determined by the algorithm 400. Since the camera 10 has the capability of using aperture size to maximize the range within which an object is located, and still be in focus the camera 10 is referred to as "aperture sensitive". This is an important feature of the camera 10 as the fixed focus mode of operation is the default mode. Such a default mode saves a substantial amount of time in comparison to prior art cameras that power up in an automatic focus mode, as only one primary lens movement is required.

Considering now the fixed focus mode algorithm 100 in still greater detail with reference to FIG. 5, the fixed focus mode algorithm 100 begins at a start command 102 when power is applied to the camera 10. The program then proceeds to a command instruction 104 that places the camera 10 in the fixed focus mode of operation changing the focus switch 31 from its normally neutral position to a fixed focus mode setting indicated at 26.

From the command instruction 104 the program goes to a determination step 105 to wait for the user to activate the shutter button 36 to a ½ way position to initiate an adjustment. The program advances from step 105 to a command step 106 when the shutter button 36 has been depressed to the adjust position. Step 106 causes the shutter 19 to be fully opened exposing the CCD 15 to the ambient lighting conditions via the primary lens system 14. Once the microprocessor 25 receives the digital signal indicative of the ambient lighting conditions, the program advances to a call command step 108 that calls the algorithm 400 that calculates a proper aperture setting and shutter speed based upon the strength of the ambient light signal received by the microprocessor 25. The aperture shutter speed control algorithm 400 will be discussed hereinafter in greater detail.

After the aperture setting and shutter speed has been determined by reference to a simple look up table, via the algorithm 400, the program returns to the fixed focus mode algorithm at a command step 110 that causes the stepper motor 29 to adjust the size of the aperture to a determined one of its three primary aperture settings indicated at 20,21, and 22 respectively. The program then proceeds to a determination step 112 to verify that the aperture 18 has been set to its proper setting.

Once the aperture 18 has been adjusted, the program proceeds to a command step 116 that retrieves from a look up table in the internal memory 84 a focal point setting. From the command step 116 the program advances to a command step 118 that causes the stepper motor 29 to move the primary lens system 14 to the retrieve focal point setting.

The program goes to a determination step 120 that determines whether the lens 14 has been adjusted. Once the lens focal point is set, the program proceeds to an end command 122.

Figure 11:
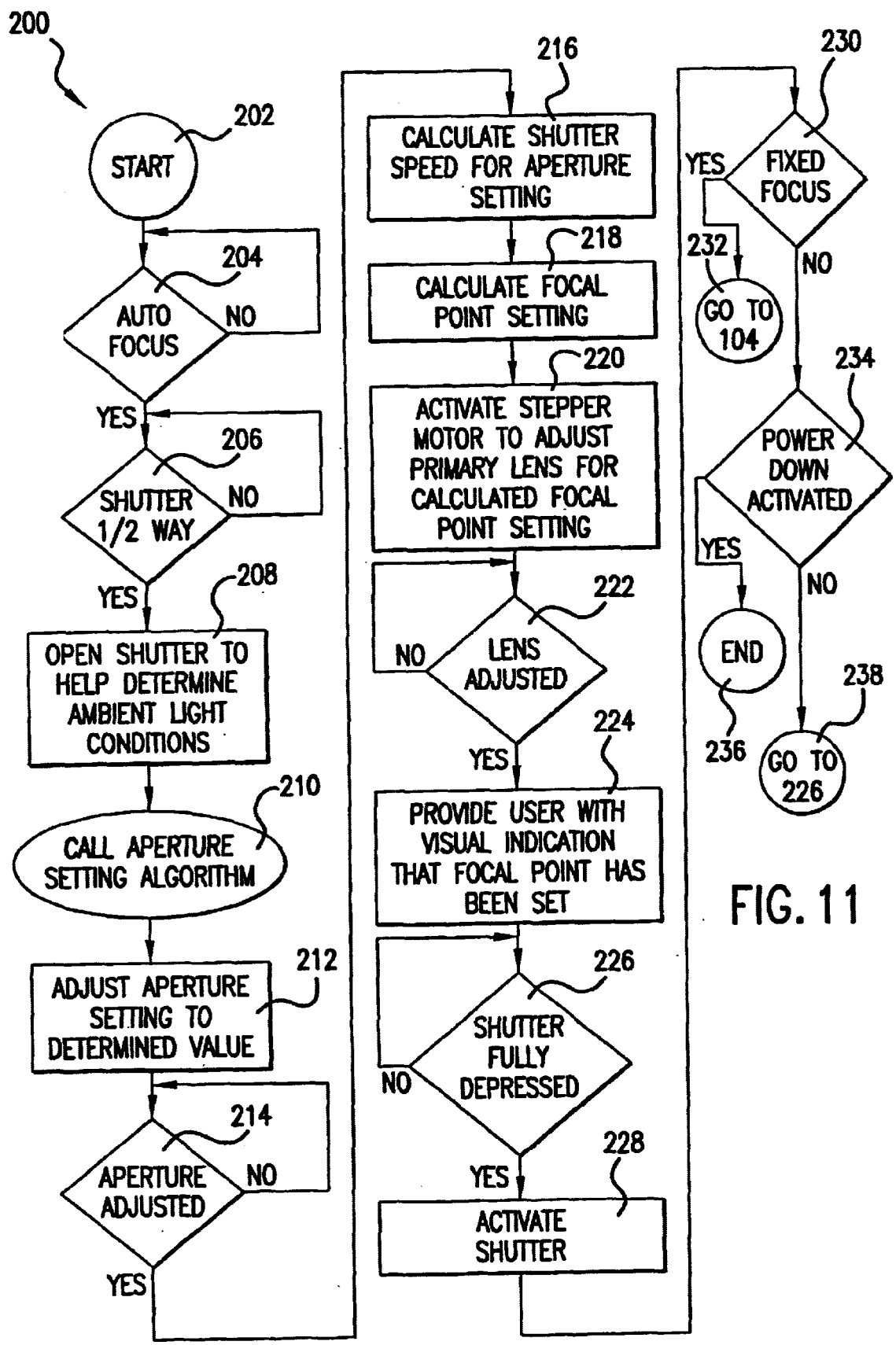
FIG. 11 is a high-level auto focus mode flow chart illustrating the operational steps of the digital camera of FIG. 1.

Considering now the automatic focus mode algorithm 200 in greater detail with reference to FIG. 11, in order to place the camera 10 in the automatic focus mode of operation, the user toggles the focus from its normally fixed focus position at 26 to an automatic focus mode setting indicated at 28. Once the camera 10 is placed in the automatic focus mode, the user is free to depress a shutter release button or switch 34 to an initial half way stop position for generating an electrical signal that causes the microprocessor 25 to execute the automatic focus mode algorithm 200. In the automatic focus mode of operation, the following operational steps are achieved while the shutter release button is disposed at its initial half way stop position:

1. The algorithm 200 causes the shutter 19 to be opened allowing the microprocessor 25 to receive a digital signal indicative of the ambient lighting conditions.
2. The algorithm 200 causes the LCD 38 to provide a new indication to the user, such as a blinking indication, that the primary lens system 14 has been adjusted to the proper focal point. Once the user sees this new indication, the shutter release button 34 may be fully depressed resulting in the capturing and storing of a digital image in proper focus.

The setting determined in the above described procedure are maintained for subsequent shutter actuation to facilitate ease of use by the user.

Considering now the auto focus mode algorithm 200 in still greater detail with reference to FIG. 11, the auto focus mode algorithm 200 begins at a start command 202 when power is applied to the camera 10. The program then proceeds to a determination step 204 to detect whether the user has activated the focus switch 31 to place the camera in the auto focus mode of operation. In this regard, the program loops at the determination step 204 until the user activates the toggle switch 31 to place the camera in the auto focus mode.

From the determination step 204 the program proceeds a determination step 206 to wait for the user to depress the shutter button 34 to its half way stop point. When the user depresses the shutter button 34 to its half way stop point, the program advances to a command step 208 that causes the shutter 19 to be fully opened exposing the CCD 15 to the ambient lighting conditions via the primary lens system 14. Once the microprocessor 25 receives the digital signal indicative of the ambient lighting conditions, the program advances to a call command step 210 that calls the algorithm 400 that determines a shutter speed and proper aperture setting based upon the strength of the ambient light signal received by the microprocessor 25.

After the aperture setting and shutter speed has been determined in algorithm 400, the program returns to the auto focus mode algorithm 200 at a command step 212 that causes the stepper motor 29 to close the shutter 19 and to adjust the size of the aperture to the determined one of its three primary aperture settings indicated at 20,21, and 22 respectively. The program then proceeds to a determination step 214 to verify that the aperture 18 has been set to its proper setting.

Once the aperture 18 has been adjusted, the program proceeds to a command step 216 that calculates a proper shutter speed for the determined aperture setting. The shutter speed is stored in the internal memory 84 of the microprocessor. The program then advances to a call step 218 that calculates a focal point position for the primary lens 14 based upon the amount of ambient light being received by the CCD 15. This determination is made so the CCD 15 will receive the maximum amount of light possible based on the current ambient light conditions. The algorithm that calculates the focal point position is well known to those skilled in the art and will not be described hereinafter in greater detail. The program then goes to a command step 220 that causes the stepper motor 29 to advance the lens system 14 to the determined position.

Next the program proceeds to a determination step 222 to wait for the lens system 14 to be moved to its proper position. Once the lens system 14 has been adjusted the program goes to a command step 224 that causes the LCD unit 38 to blink at a desired blink frequency to provide the user with an indication that the lens system 14 has been adjusted and that the camera is now in a ready state for a photograph to be taken.

The program then goes to a determination step 226 to wait for the user to fully depress the shutter button 34. In this regard, when the user fully depresses the shutter button 34 the program advances from the determination step 226 to an activate command 228 that activates the shutter 19 at the determined shutter speed to expose the CCD 15.

The program then goes to a determination step 230 to verify whether or not the user has activated the focus switch 31 to change the camera back to the fixed focus mode of operation. If it is determined that the user has changed the mode of operation, the program proceeds to the fixed focus mode algorithm 100 at the command 105 where the program proceeds as described previously.

If a determination is made at step 230 that the user desires to continue operating in the auto focus mode of operation, the program goes to a determination step 234 to determine when the user desires to power down the camera 10. If the user desires to power down the camera 10, the program advances to an end step 236 to exit the auto focus algorithm 200. If the user does not desire to power down the camera, the program goes to a go to step 238 that returns to the determination step 206 to wait for the user to again depress the shutter button 34. In this manner, the camera remains adjusted for continuous shooting of additional images until the user either changes the auto focus mode to the fixed focus mode or the camera is powered down to an off power condition.

Considering now the aperture control algorithm 400 in greater detail, the aperture control algorithm is responsive to the digital signal provided through the analog to digital converter 56 an automatically adjusts the aperture 18 to an optimal setting relative to the amount of ambient light conditions surrounding the object to be photographed. In this regard, the algorithm 400 is entered at a start command 402 (FIG. 4) from either the call command 108 in the fixed focus mode algorithm 100 or the call command 216 in the auto focus mode algorithm 200. The program then proceeds to a command 404 that determines the proper aperture setting for the given or measured ambient light conditions.

Figure 9:
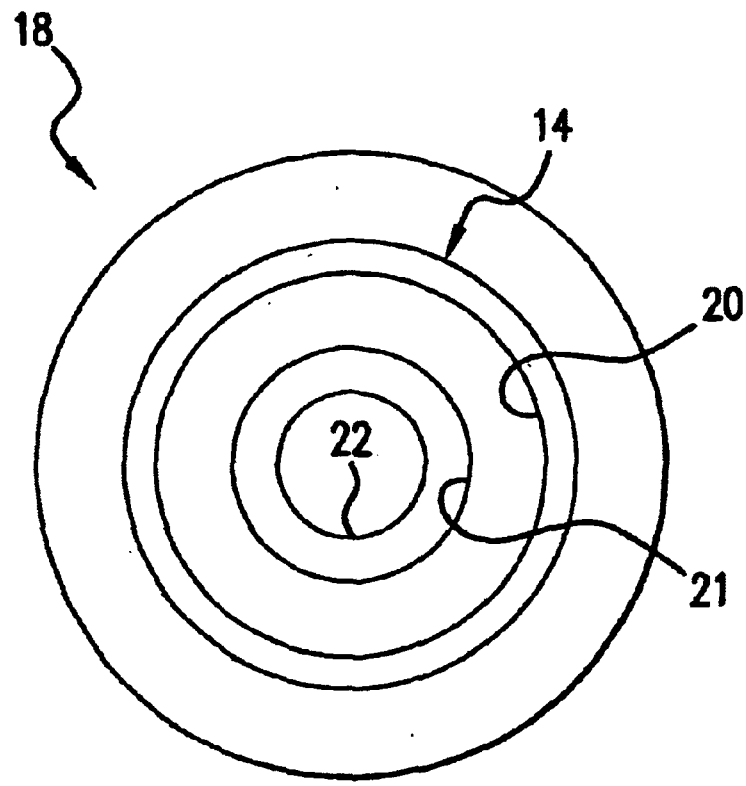
FIG. 9 is a diagrammatic representation of a front face view of an aperture lens arrangement within the digital camera of FIG. 1.
Figure 10:
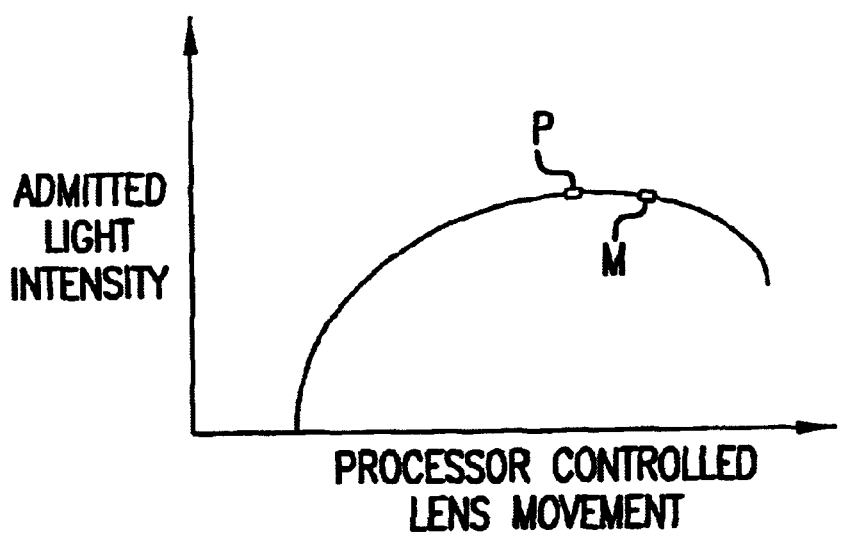
FIG. 10 is a graphical representation of admitted light intensity vs. lens movement within the digital camera of FIG. 1.

Once the proper aperture setting has been determined at step 404, the program goes to another determination step 405 to determine a shutter speed base on the determined aperture setting. The program then advances to a move command at step 406 that causes the stepper motor 29 to move the aperture 18 to one of its three primary positions as best seen in FIG. 9. The aperture settings are conventional camera settings of 2.8, 5.6, and 11 which settings are indicated generally at 20,21 and 22 respectively. The program then goes to a return step 408 that returns the program to the active focus control 100 or 200 depending upon which focus mode the camera 10 was set to operate. If the camera is operating in the fixed mode the program advances to step 110, in the fixed focus mode algorithm 100, otherwise the program advances to step 212 in the auto focus algorithm 200.

Figure 13:
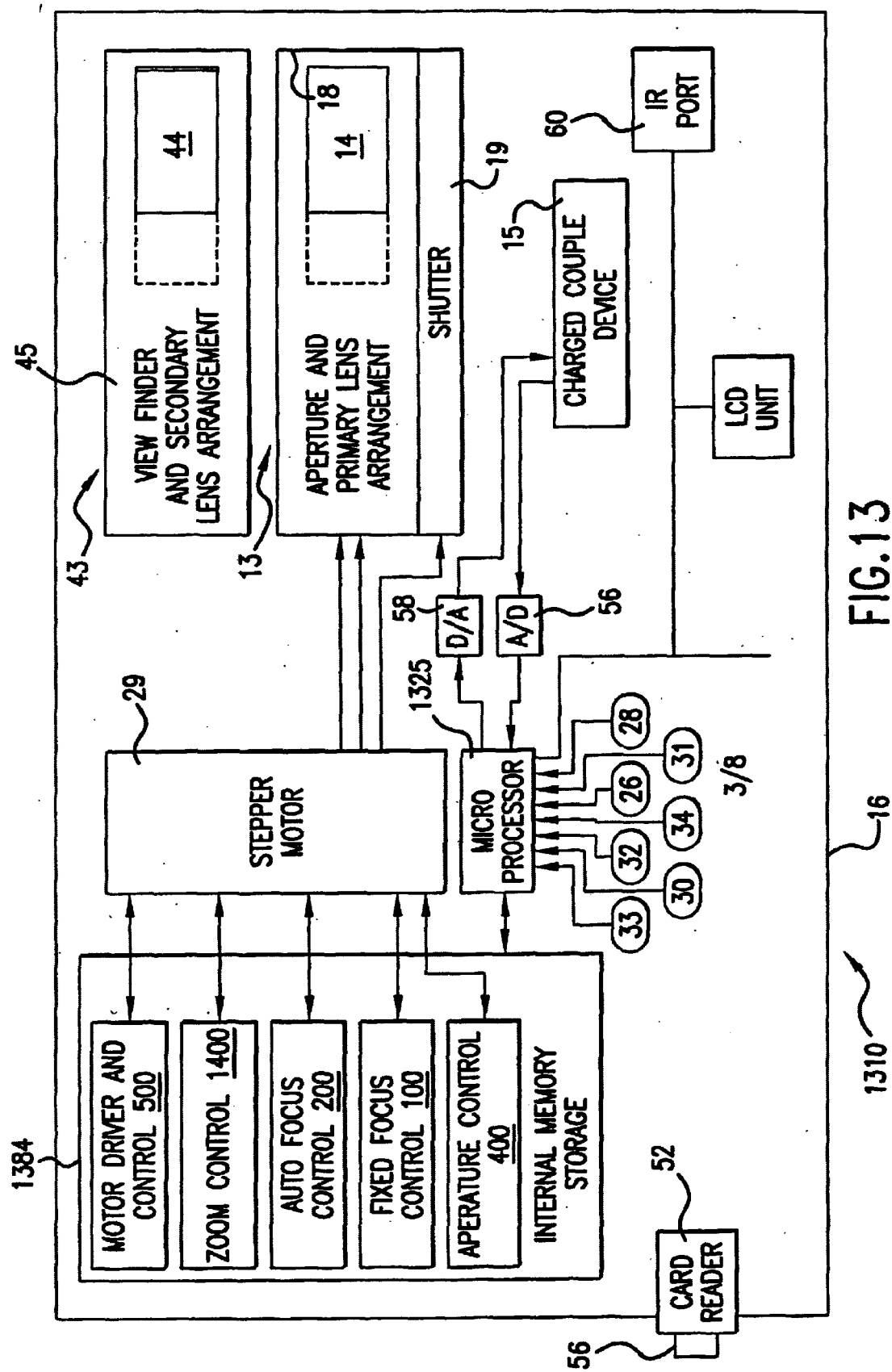
FIG. 13 is a block diagrammatic representation of another digital camera that is constructed in accordance with the preferred embodiment of the present invention.
Figure 14:
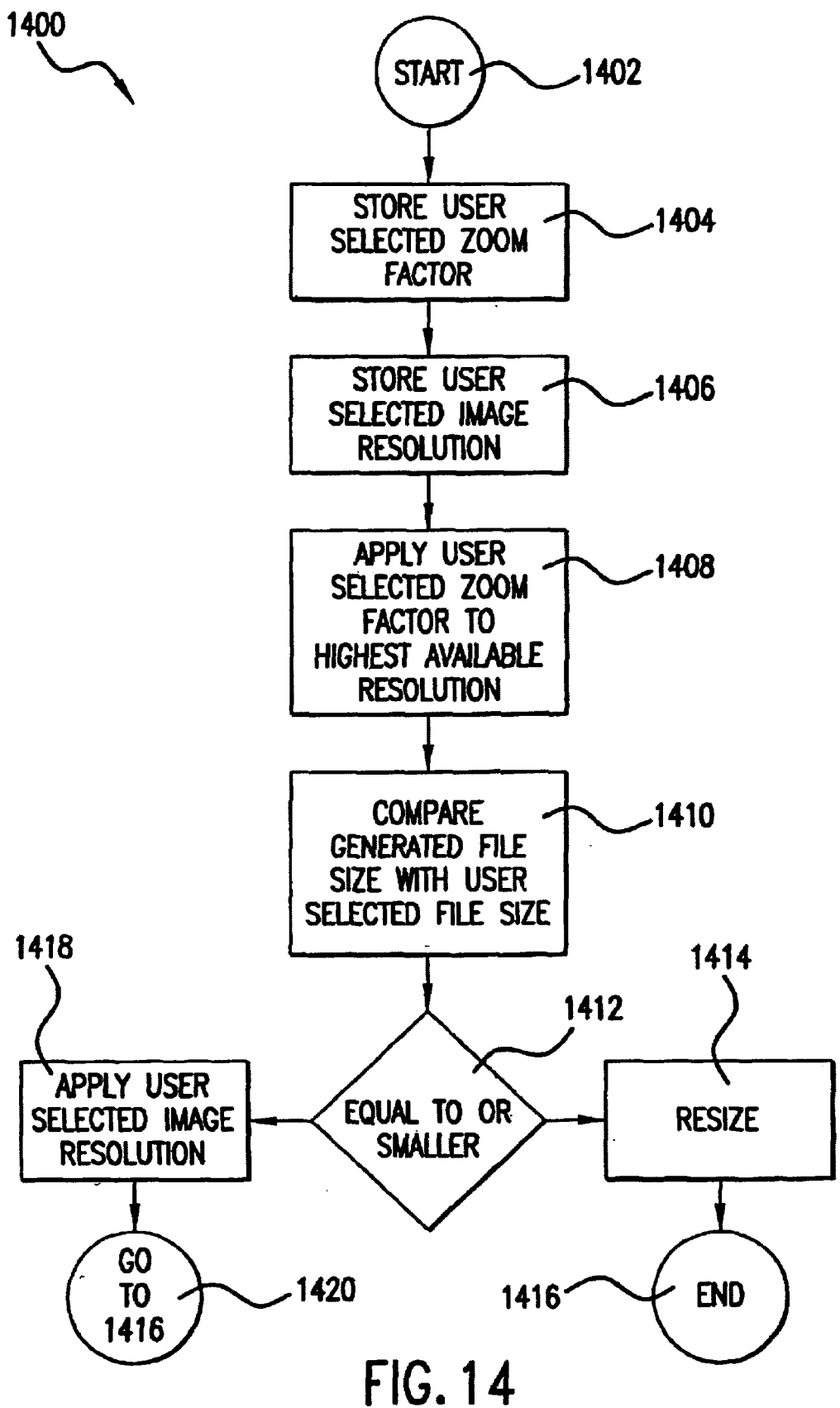
FIG. 14 is a high-level flow chart illustrating the enhanced digital zoom control steps of the digital camera of FIG. 13.

Referring now to the drawings and more particularly to FIG. 13, there is shown a digital camera 1310 which is constructed in accordance with the present invention. The digital camera 1310 is substantially similar to the camera 10 except the camera 1310 includes an image resolution switch 1320 for permitting the user to select one of a plurality of different image resolutions or file sizes as indicated in Table C:

TABLE C

| File Size Without Digital Zoom |
|---|
| 1600 × 1200 |
| 1280 × 960 |
| 1024 × 768 |
| 640 × 480 |

The different image resolution selections as indicated in Table C allows the user to make a tradeoff between file size and image quality.

As best seen in FIG. 13, the digital camera 1310 also includes a microprocessor 1325 that is responsive to an enhanced digital zoom control algorithm 1400. The enhanced digital zoom control algorithm 1400 as will be explained hereinafter in greater detail, compares a set of resolution pixel values in a generated image file with corresponding ones of resolution pixel values in a user selected file to determine which one of the files has the greater settings. The control algorithm then provides as a final digital zoom image resolution using the set of resolution pixel values in the generated image file when the corresponding ones of the resolution pixel values in the user selected file are at least equal to but not less than the corresponding resolution pixel values in the generated image file, and a scaled down set of resolution pixel values when the corresponding ones of the resolution pixel values in the user selected files are less than the corresponding resolution pixel values in the generated image file.

Before discussing the algorithm 1400 in greater detail, it may be beneficial to review once again the traditional operation of digital zoom. In this regard, when digital zoom is applied to a captured image, the traditional zoom control crops the captured image and causes the image to be displayed in the current resolution setting of the camera. Thus, for example, if a 1.5× digital zoom factor was selected by a user using a 1024 by 768 resolution setting, a captured image would be stored in factored file size of 1024/1.5 locations by 768/1.5 locations to provide an image having a resolution of 682 pixels by 512 pixels. Table D summarizes the resulting file sizes for 1.5× and 2.0× digital zoom in a traditional digital camera.

TABLE D

| File Size w/o Digital Zoom Effect | File Size with 1.5x Digital Zoom Effect | File Size with 2.0x Digital Zoom Effect |
|---|---|---|
| 1600 × 1200 | 1066 × 800 | 800 × 600 |
| 1280 × 960 | 853 × 640 | 640 × 480 |
| 1024 × 768 | 682 × 512 | 512 × 384 |
| 640 × 480 | 426 × 306 | 320 × 240 |

From Table D, those skilled in the art will understand that even though a user may have set the camera resolution to a 1280 by 960 resolution mode, the camera will only deliver an image of VGA quality or 640 pixels by 480 pixels when the camera is operated with a 2.0× digital zoom effect. As will be explained hereinafter in greater detail, the enhanced digital zoom feature of the camera 310 provides a substantially improved image resolution over such a traditional camera.

Considering now the enhanced digital zoom feature algorithm 1400 in greater detail, the algorithm 1400 begins at a start command 1402 and advances to a store command 1404 that causes the zoom factor setting $Z_f$ selected by the user to be stored. In the present embodiment, the camera 1310 has two zoom factor setting: $Z_{f1}$=1.5× zoom and $Z_{f2}$=2.0× zoom. Although the camera 1310 has only two zoom factor settings, it is contemplated that the camera 1310 could have a large number of different zoom factors selected from the following group of zoom factors: 1.25×, 1.75×, 2.25×, 2.75×, 3.0×, 3.25×, 3.5×, 3.75×, 4.0×, ... $Z_{fn}$.

After the storing the user selected zoom factor, the algorithm proceeds to a store command 1406 that causes the image resolution setting $N_{sn}$ by $M_{rn}$ selected by the user to be stored. In the present embodiment, the camera 1310 has four available resolution settings where the highest available image resolution value is 1600 pixels×1200 pixels as best seen in Table D. Although the camera 1310 has only four available resolution settings, it is contemplated that the camera 1310 could have a large number of different resolution settings where the highest available image resolution value is expressed as a resolution of $N_{max}$ pixels by $M_{max}$ pixels.

The algorithm 1400 proceeds to a calculate command 1408 that applies the user selected zoom factor $Z_f$ to the highest available image resolution value in the camera 1310, such as the resolution value of $N_{max}$ pixels by $M_{max}$ pixels to obtain a maximum image file size of $N_{max}/Z_f$ pixels by $M_{max}/Z_f$ pixels. Thus for example, if the highest available camera image resolution value is 1600 pixels by 1200 pixels, with a user selected 1.5× digital zoom factor, the algorithm 1400 would apply the zoom factor to generate a resulting file size given by the following calculations:

1600/1.5=1066

1200/1.5=800

The algorithm 1400 then proceeds to a compare command 1410 to compare the generated file size with the user selected file size. The algorithm then proceeds to a decision step 1412 to determine whether the file size generated in step 1408 is greater than the user selected image resolution or file size ($N_{sn}$ by $M_{rn}$) selected by the user and stored previously at step 1406. Thus for example, if the user selected an image resolution of 1024 pixels by 768 pixels, the algorithm would compare the generated file size of 1066×800 with the selected file size of 1024 by 768.

If a determination is made that the calculated set of resolution pixel values in the generated image file (e.g. 1066×800) is smaller or equal in both dimensions to the size of the user selected image resolution file (1024×768 for this example), the algorithm 1400 proceeds to a select command 1418 that provides as a final digital zoom image resolution, the user selected image resolution value. The algorithm then advances to a go to command at 1420 terminating at an end command 1416.

If a determination is made that the file size that resulted from the calculate step 1408 exceeds the file size selected by the user in either dimension (as it does in the present example) then the image resolution is resized a command step 1414 by a factor of the larger of the following:

[($N_{max}/Z_f$ pixels divided by $N_{sn}$ pixels) pixels divided into $N_{max}/Z_f$ pixels] or 1066/1024=1.04;

[($M_{max}/Z_f$ pixels divided by $M_{rn}$ pixels) pixels divided into $M_{max}/Z_f$ pixels] or 800/768=1.04.

Since the reduction factors in the present example are the same, the captured image stored in camera memory system 1384 is resized while in memory so that the dimensions that exceeds the selected size become equal. Thus, the captured image is scaled down by the scaling factor of 1.04 to provide a final digital zoom image resolution determined as follows:

1066/1.04=1025 pixels

800/1.04=768 pixels

The algorithm the n proceeds to the end command 1416.

Table E summarizes the resulting file sizes for the 1.5× digital zoom factor and the 2.0× digital zoom factor.

TABLE E

Enhanced Digital Zoom Image Resolutions

| File Size Without Digital Zoom | File Size With 1.5x Digital Zoom | File Size With 2.0x Digital Zoom |
|---|---|---|
| 1600 × 1200 | 1066 × 800 | 800 × 600 |
| 1280 × 960 | 1066 × 800 | 800 × 600 |
| 1024 × 768 | 1024 × 768 | 800 × 600 |
| 640 × 480 | 640 × 480 | 640 × 480 |

As will be noted by comparing Table D with Table E, for all image size selections above the highest available image resolution of 1600 pixels by 1200 pixels, the enhanced digital zoom control algorithm 1400 provides a higher resolution to the user, the maximizing the image quality of the resulting image.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

I claim:

1. A method of maximizing image resolution in a digital camera, comprising:

applying a user selected digital zoom factor $Z_f$ to a highest available image resolution value to obtain a maximum image file size;

applying a user selected image file size to a digitally zoomed image when said maximum image file size is at least equal to but not greater than said user selected image file size; and applying a resized image file size to said digitally zoom image when said maximum image file size is greater than said user selected image file size, wherein said resized image file size is scaled down file size.

2. A method of maximizing image resolution in a digital camera according to claim 1, wherein said user selected digital zoom factor $Z_f$ includes at least two digital zoom factors.

3. A method of maximizing image resolution in a digital camera according to claim 2, wherein one of said at least two digital zoom factors is $Z_{f1}$ and wherein the other one of said at least two digital zoom factors is $Z_{f2}$.

4. A method of maximizing image resolution in a digital camera according to claim 3, wherein $Z_{f1}$ is a 1.5× zoom factor and wherein $Z_{f2}$ is a 2.0× zoom factor.

5. A method of maximizing image resolution in a digital camera according to claim 1, wherein said highest available image resolution value is $N_{max}$ pixels by $M_{max}$ pixels.

6. A method of maximizing image resolution in a digital camera according to claim 5, wherein said highest available image resolution value is 1600 pixels by 1200 pixels.

7. A method of maximizing image resolution in a digital camera according to claim 6, wherein said maximum image file size is $N_{max}/Z_f$ pixels by $M_{max}/Z_f$ pixels.

8. A method of maximizing image resolution in a digital camera according to claim 7, wherein said maximum image file size is 1066 pixels by 800 pixels when $Z_f$ is a 1.5× zoom factor.

9. A method of maximizing image resolution in a digital camera according to claim 7, wherein said maximum image file size is 800 pixels by 600 pixels when $Z_f$ is a 2.0× zoom factor.

10. A method of maximizing image resolution in a digital camera, comprising:

applying a user selected digital zoom factor $Z_f$ to a highest available image resolution value of $N_{max}$ pixels by $M_{max}$ pixels to obtain a maximum image file size of $N_{max}/Z_f$ pixels by $M_{max}/Z_f$ pixels;

applying a user selected image file size of $N_{sn}$ pixels by $M_{rn}$ pixels to a $Z_f$ digitally zoomed image when said maximum image file size is at least equal to but not greater than said user selected image file size; and applying a resized image file size to said $Z_f$ digitally zoom image when said maximum image file size is greater than said user selected image file size, wherein said resized image file size is scaled down file size.

11. A method of maximizing image resolution in a digital camera according to claim 10, wherein said scaled down file size is $[(N_{max}/Z_f$ pixels divided by $N_{sn}$ pixels) pixels divided into $N_{max}/Z_f$ pixels] by $[(M_{max}/Z_f$ pixels divided by $M_{rn}$ pixels) pixels divided into $M_{max}/Z_f$ pixels].

12. A method of maximizing image resolution in a digital camera according to claim 10, wherein said step of applying a user selected digital zoom factor $Z_f$ includes:

receiving a zoom selection signal indicative of said user selected digital zoom factor $Z_f$; and storing said user selected digital zoom factor $Z_f$.

13. A digital camera, comprising:

means for applying a user selected digital zoom factor $Z_f$ to a highest available image resolution value to obtain a maximum image file size;

means for applying a user selected image file size to a digitally zoomed image when said maximum image file size is at least equal to but not greater than said user selected image file size; and means for applying a resized image file size to said digitally zoom image when said maximum image file size is greater than said user selected image file size, wherein said resized image file size is scaled down file size.

14. A method of providing a final digital zoom image resolution, comprising:

comparing a set of resolution pixel values in a generated image file with corresponding ones of resolution pixel values in a user selected file;

providing as the final digital zoom image resolution said set of resolution pixel values in the generated image file when the corresponding ones of the resolution pixel values in the user selected file are at least equal but not less than the corresponding resolution pixel values in said generated image file; and providing as the final digital zoom image resolution a scaled down set of resolution pixel values when the corresponding ones of the resolution pixel values in the user selected file are less than the corresponding resolution pixel values in said generated image file.

15. A digital camera, comprising:

a processor having an algorithm for comparing a set of resolution pixel values in a generated image file with corresponding ones of resolution pixel values in a user selected file and for providing as a final digital zoom image resolution: said set of resolution pixel values in the generated image file when the corresponding ones of the resolution pixel values in the user selected file are at least equal but not less than the corresponding resolution pixel values in said generated image file, and a scaled down set of resolution pixel values when the corresponding ones of the resolution pixel values in the user selected file are less than the corresponding resolution pixel values in said generated image file.

16. A digital camera according to claim 15, wherein said algorithm includes the following steps:

applying a user selected digital zoom factor $Z_f$ to a highest available image resolution value of $N_{max}$ pixels by $M_{max}$ pixels to obtain a maximum image file size of $N_{max}/Z_f$ pixels by $M_{max}/Z_f$ pixels;

applying a user selected image file size of $N_{sn}$ pixels by $M_{rn}$ pixels to a $Z_f$ digitally zoomed image when said maximum image file size is at least equal to but not greater than said user selected image file size; and applying a resized image file size to said $Z_f$ digitally zoom image when said maximum image file size is greater than said user selected image file size, wherein said resized image file size is scaled down file size.

17. A digital camera according to claim 15, wherein said algorithm includes the following steps:

comparing the set of resolution pixel values in said generated image file with corresponding ones of resolution pixel values in said user selected file;

providing as the final digital zoom image resolution said set of resolution pixel values in the generated image file when the corresponding ones of the resolution pixel values in the user selected file are at least equal but not less than the corresponding resolution pixel values in said generated image file; and providing as the final digital zoom image resolution said scaled down set of resolution pixel values when the corresponding ones of the resolution pixel values in the user selected file are less than the corresponding resolution pixel values in said generated image file.

18. A digital camera, comprising:

a modifier circuit for applying a user selected digital zoom factor $Z_f$ to a highest available camera image resolution value to obtain a maximum image file size; and a comparison circuit for applying a user selected image file size to a digitally zoomed image when said maximum image file size is at least equal to but not greater than said user selected image file size, and for applying a resized image file size to said digitally zoom image when said maximum image file size is greater than said user selected image file size, wherein said resized image file size is scaled down file size.

* * * * *